United States Patent
Hu et al.

(10) Patent No.: US 10,127,459 B2
(45) Date of Patent: Nov. 13, 2018

(54) TRAILER TYPE IDENTIFICATION SYSTEM

(71) Applicant: Ford Global Technologies, LLC, Dearborn, MI (US)

(72) Inventors: Zheng Hu, Farmington Hills, MI (US); Nathaniel Abram Rolfes, Detroit, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/352,091

(22) Filed: Nov. 15, 2016

(65) Prior Publication Data

US 2017/0177949 A1  Jun. 22, 2017

Related U.S. Application Data

(63) Continuation-in-part of application No. 15/220,750, filed on Jul. 27, 2016, now Pat. No. 9,796,228, and a
(Continued)

(51) Int. Cl.
*B60R 1/00* (2006.01)
*G06K 9/00* (2006.01)
(Continued)

(52) U.S. Cl.
CPC .......... *G06K 9/00791* (2013.01); *B60R 1/00* (2013.01); *B60W 10/04* (2013.01); *B60W 10/184* (2013.01); *B60W 10/20* (2013.01); *B60W 30/0953* (2013.01); *B60W 50/14* (2013.01); *B62D 13/06* (2013.01); *G06K 9/6202* (2013.01); *G06T 7/12* (2017.01); *B60R 2300/302* (2013.01);
(Continued)

(58) Field of Classification Search
CPC ................. B60W 50/14; G06T 2207/30252
See application file for complete search history.

(56) References Cited

U.S. PATENT DOCUMENTS

| 4,897,642 A | 1/1990 | DiLullo et al. |
| 5,142,278 A | 8/1992 | Moallemi et al. |

(Continued)

FOREIGN PATENT DOCUMENTS

| CN | 202159367 U | 3/2012 |
| DE | 102008045436 A1 | 3/2010 |

(Continued)

OTHER PUBLICATIONS

Skybitz, website, 2012, pp. 1-3, http://www.skybitz.com/products-services/hardware/bat-xtndr/.
(Continued)

*Primary Examiner* — Gandhi Thirugnanam
(74) *Attorney, Agent, or Firm* — Franklin MacKenzie; Price Heneveld LLP

(57) ABSTRACT

A trailer type identification system is provided herein. The system includes an imaging device for capturing images of a trailer connected to a vehicle, and a controller for analyzing the captured. The controller identifies vehicle and trailer contours, predicts a trailer type based on detection of a connection between the identified vehicle and trailer contours, and validates the prediction if the identified trailer contour exhibits motion during a vehicle turn event.

20 Claims, 23 Drawing Sheets

Related U.S. Application Data continuation-in-part of application No. 14/972,761, filed on Dec. 17, 2015, now Pat. No. 9,610,975.

(51) Int. Cl.

| | | |
|---|---|---|
| *B62D 13/06* | (2006.01) |
| *G06K 9/62* | (2006.01) |
| *B60W 10/20* | (2006.01) |
| *B60W 10/184* | (2012.01) |
| *B60W 30/095* | (2012.01) |
| *B60W 50/14* | (2012.01) |
| *B60W 10/04* | (2006.01) |
| *G06T 7/12* | (2017.01) |

(52) U.S. Cl.
CPC .... *B60R 2300/80* (2013.01); *B60W 2050/146* (2013.01); *G06T 2207/30252* (2013.01)

(56) References Cited

U.S. PATENT DOCUMENTS

| | | | |
|---|---|---|---|
| 5,282,641 A | 2/1994 | McLaughlin |
| 5,442,810 A | 8/1995 | Jenquin |
| 5,905,433 A | 5/1999 | Wortham |
| 5,999,091 A | 12/1999 | Wortham |
| 6,111,524 A | 8/2000 | Lesesky et al. |
| 6,142,372 A | 11/2000 | Wright |
| 6,501,376 B2 | 12/2002 | Dieckmann et al. |
| 6,687,609 B2 | 2/2004 | Hsiao et al. |
| 6,847,916 B1 | 1/2005 | Ying |
| 6,999,856 B2 | 2/2006 | Lee et al. |
| 7,039,504 B2 | 5/2006 | Tanaka et al. |
| 7,136,754 B2 | 11/2006 | Hahn et al. |
| 7,175,194 B2 | 2/2007 | Ball |
| 7,696,862 B2 | 4/2010 | Herschell et al. |
| 7,715,953 B2 | 5/2010 | Shepard |
| 7,731,302 B2 | 6/2010 | Tandy, Jr. et al. |
| 7,760,077 B2 | 7/2010 | Day |
| 7,825,782 B2 | 11/2010 | Hermann |
| 7,932,815 B2 | 4/2011 | Martinez et al. |
| 7,950,751 B2 | 5/2011 | Offerle et al. |
| 8,010,252 B2 | 8/2011 | Getman et al. |
| 8,068,019 B2 | 11/2011 | Bennie et al. |
| 8,165,770 B2 | 4/2012 | Getman et al. |
| 8,179,238 B2 | 5/2012 | Roberts, Sr. et al. |
| 8,223,204 B2 | 7/2012 | Hahn |
| 8,362,888 B2 | 1/2013 | Roberts, Sr. et al. |
| 8,768,535 B2 | 7/2014 | Kossira et al. |
| 8,851,521 B2* | 10/2014 | Rhymer .................... B60P 3/32 |
| | | | 280/441.2 |
| 8,930,140 B2 | 1/2015 | Trombley et al. |
| 9,008,913 B1 | 4/2015 | Sears et al. |
| 9,156,496 B2 | 10/2015 | Greenwood et al. |
| 9,164,955 B2 | 10/2015 | Lavoie et al. |
| 9,227,474 B2 | 1/2016 | Liu |
| 9,238,483 B2 | 1/2016 | Hafner et al. |
| 9,315,212 B1* | 4/2016 | Kyrtsos ................. G05D 1/0088 |
| 9,335,162 B2 | 5/2016 | Kyrtsos et al. |
| 9,352,777 B2 | 5/2016 | Lavoie et al. |
| 9,428,188 B2 | 8/2016 | Schwindt et al. |
| 9,616,923 B2 | 4/2017 | Lavoie et al. |
| 9,623,904 B2 | 4/2017 | Lavoie et al. |
| 9,676,377 B2 | 6/2017 | Hafner et al. |
| 9,827,818 B2 | 11/2017 | Hu et al. |
| 9,840,278 B2 | 12/2017 | Lavoie et al. |
| 2004/0222881 A1 | 11/2004 | Deng et al. |
| 2005/0071373 A1 | 3/2005 | Long |
| 2007/0058273 A1 | 3/2007 | Ito et al. |
| 2007/0271267 A1 | 11/2007 | Lim et al. |
| 2008/0231701 A1 | 9/2008 | Greenwood et al. |
| 2009/0045924 A1 | 2/2009 | Roberts, Sr. et al. |
| 2009/0093928 A1 | 4/2009 | Getman et al. |
| 2009/0219147 A1 | 9/2009 | Bradley et al. |
| 2009/0271078 A1* | 10/2009 | Dickinson ............ G06K 9/3241 |
| | | | 701/51 |
| 2009/0322510 A1* | 12/2009 | Berger .................. G06Q 10/08 |
| | | | 340/539.1 |
| 2010/0156667 A1 | 6/2010 | Bennie et al. |
| 2011/0001825 A1 | 1/2011 | Hahn |
| 2011/0257860 A1 | 10/2011 | Getman et al. |
| 2011/0281522 A1 | 11/2011 | Suda |
| 2012/0200706 A1 | 8/2012 | Greenwood et al. |
| 2013/0027195 A1 | 1/2013 | Van Wiemeersch et al. |
| 2013/0041524 A1 | 2/2013 | Brey |
| 2013/0148748 A1 | 6/2013 | Suda |
| 2013/0253814 A1 | 9/2013 | Wirthlin |
| 2013/0261843 A1 | 10/2013 | Kossira et al. |
| 2014/0005918 A1 | 1/2014 | Qiang |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0160276 A1* | 6/2014 | Pliefke .................... B60R 1/00 |
| | | | 348/118 |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066349 A1* | 3/2015 | Chan .................. G01C 21/3407 |
| | | | 701/400 |
| 2015/0077557 A1 | 3/2015 | Han et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0280267 A1 | 9/2016 | Lavoie et al. |
| 2017/0073005 A1 | 3/2017 | Ghneim et al. |
| 2017/0101130 A1 | 4/2017 | Lavoie |
| 2017/0177949 A1* | 6/2017 | Hu ...................... G06K 9/00791 |
| 2017/0297619 A1 | 10/2017 | Lavoie et al. |
| 2017/0297620 A1 | 10/2017 | Lavoie et al. |
| 2017/0313351 A1 | 11/2017 | Lavoie |

FOREIGN PATENT DOCUMENTS

| | | |
|---|---|---|
| EP | 1312492 A2 | 5/2003 |
| WO | 2014123575 A1 | 8/2014 |
| WO | 2015187467 A1 | 12/2015 |

OTHER PUBLICATIONS

Verma, V.S.; Guntur, R.R.; Womg, J.Y.; "Directional Behavior During Braking of a Tractor/Semitrailer", TRID, International Jour-

(56) References Cited

OTHER PUBLICATIONS nal of Vehicle Design, May 1980, pp. 195-220, vol. 1, No. 3, Inderscience Enterprises Limited, ISSN: 1477-5360.

* cited by examiner

TRAILER TYPE IDENTIFICATION SYSTEM

CROSS-REFERENCE TO RELATED APPLICATIONS

This application is a continuation-in-part of U.S. patent application Ser. No. 15/220,750, which was filed on Jul. 27, 2016, entitled "HITCH ANGLE DETECTION FOR TRAILER BACKUP ASSIST SYSTEM," now U.S. Pat. No. 9,796,228 which is a continuation-in-part of U.S. patent application Ser. No. 14/972,761, filed Dec. 17, 2015, and entitled "HITCH ANGLE DETECTION FOR TRAILER BACKUP ASSIST SYSTEM," now U.S. Pat. No. 9,610,975 the entire disclosures of which are hereby incorporated herein by reference.

FIELD OF THE INVENTION

The present invention generally relates to trailer backup assist systems, and more particularly, to trailer backup assist systems employing hitch angle detection through image processing.

BACKGROUND OF THE INVENTION

Reversing a vehicle while towing a trailer can be challenging for many drivers, particularly for drivers that drive with a trailer on an infrequent basis or with various types of trailers. Some systems used to assist a driver in backing a trailer rely on hitch angle measurements to determine the position of the trailer relative to the vehicle. Thus, the accuracy and reliability of the hitch angle measurements can be critical to the operation of the trailer backup assist system.

SUMMARY OF THE INVENTION

According to one aspect of the present invention, a trailer type identification system is provided. The system includes an imaging device for capturing images of a trailer connected to a vehicle, and a controller for analyzing the captured images. The controller identifies vehicle and trailer contours, predicts that the trailer is a fifth wheel trailer if unable to detect a connection between the identified vehicle and trailer contours, and validates the prediction if the identified trailer contour exhibits motion during a vehicle turn event.

According to another aspect of the present invention, a trailer type identification system is provided. The system includes an imaging device for capturing images of a trailer connected to a vehicle, and a controller for analyzing the captured. The controller identifies vehicle and trailer contours, predicts a trailer type based on detection of a connection between the identified vehicle and trailer contours, and validates the prediction if the identified trailer contour exhibits motion during a vehicle turn event.

According to yet another aspect of the present invention, a trailer type identification system is provided. The system includes an imaging device for capturing images of a trailer connected to a vehicle, and a controller for analyzing the captured images. The controller detects vehicle and trailer contours, predicts a trailer type based on detection of a connection between the identified vehicle and trailer contours, and validates the prediction if the detected trailer contour exhibits an expected motion during a vehicle turn event.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
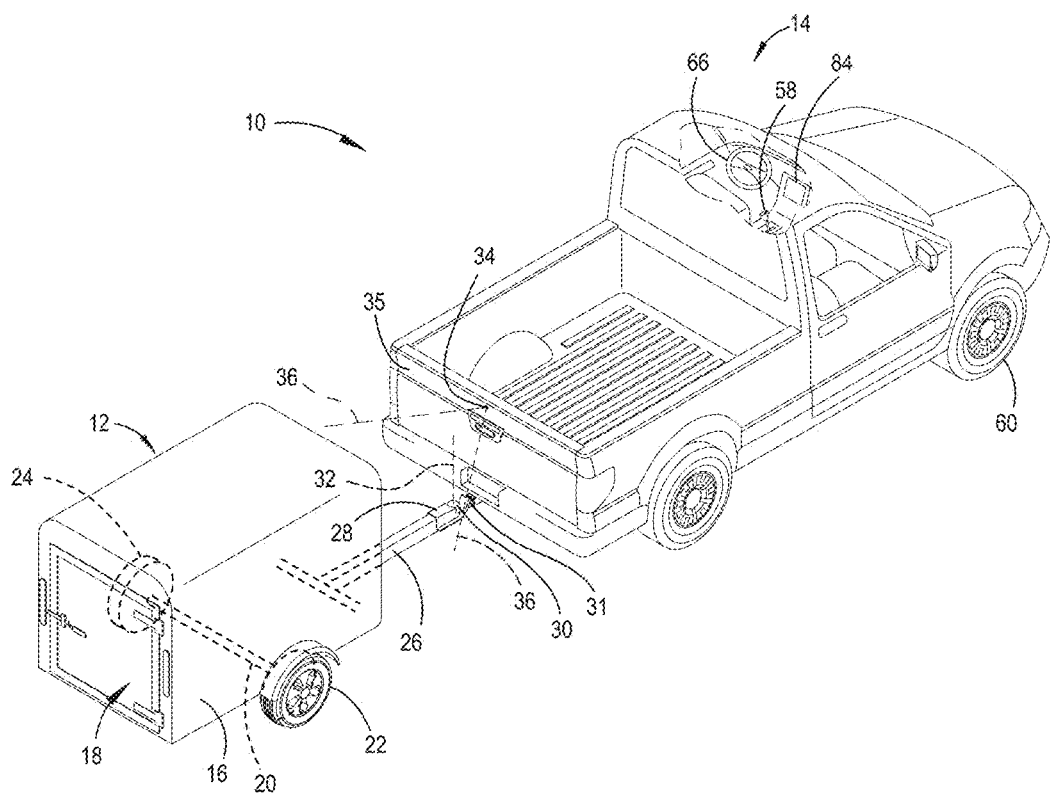
FIG. 1 is a top perspective view of a vehicle attached to a trailer with one embodiment of a hitch angle sensor for operating a trailer backup assist system.
Figure 2:
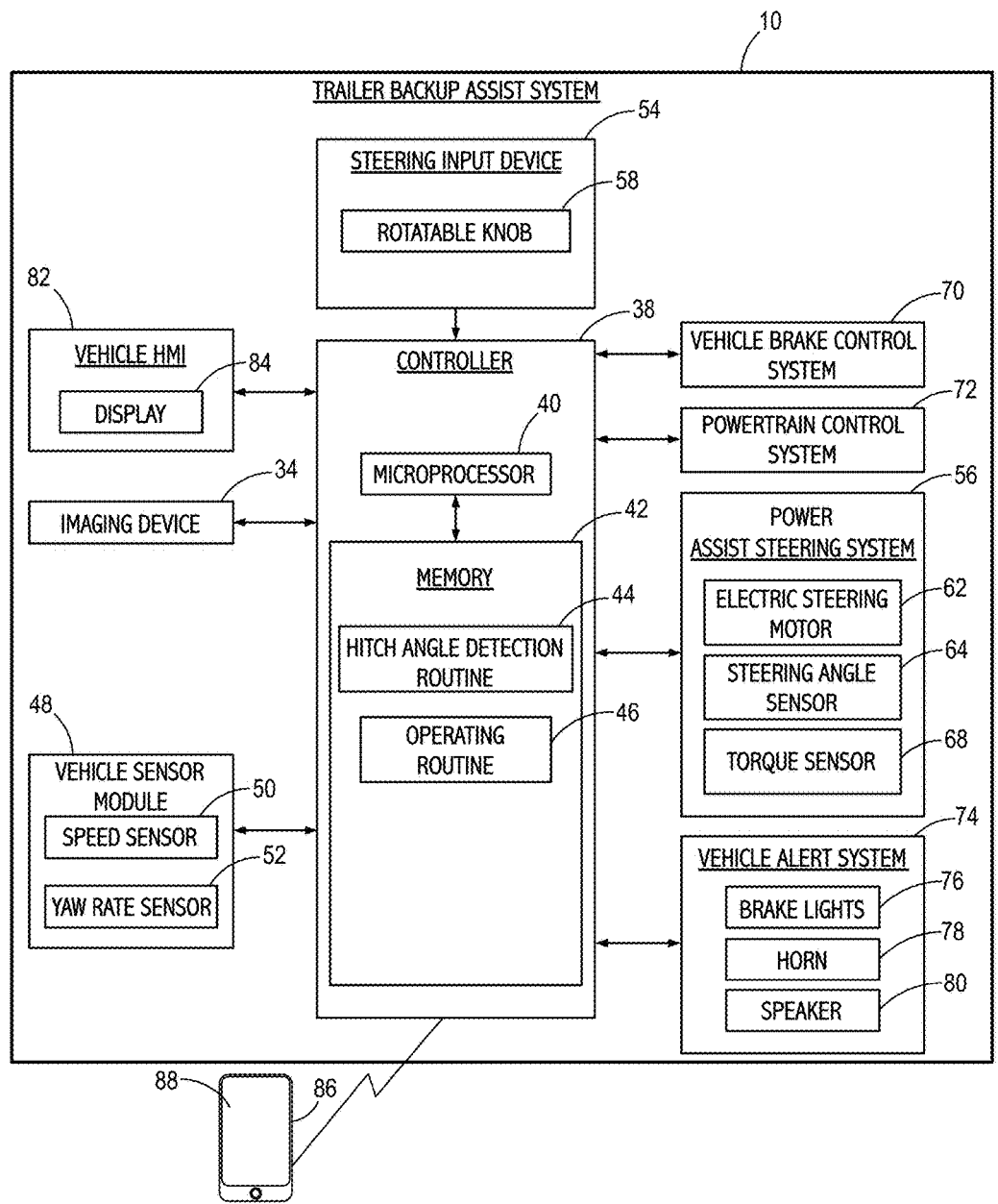
FIG. 2 is a block diagram illustrating one embodiment of the trailer backup assist system.
Figure 17:
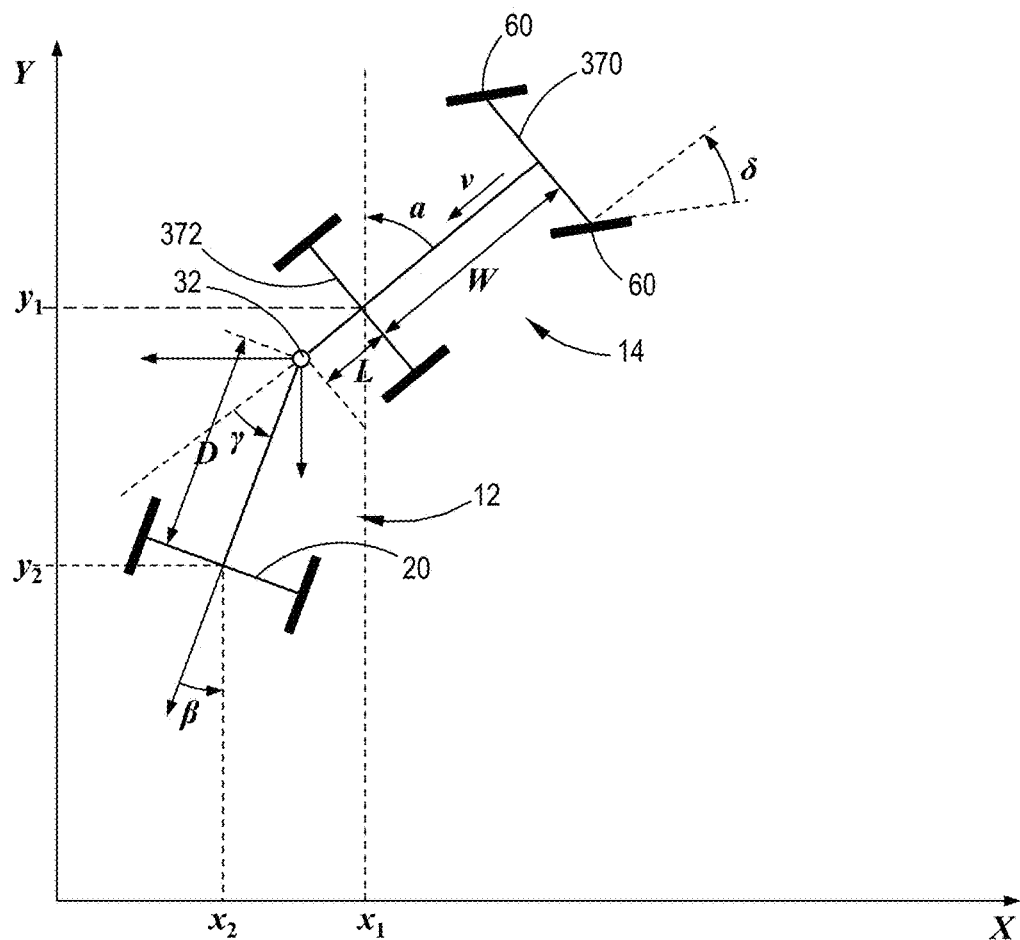
FIG. 17 is a kinematic model of the vehicle and trailer shown in FIG. 1.

Referring to FIGS. 1 and 2, reference numeral 10 generally designates a trailer backup assist system for controlling a backing path of a trailer 12 attached to a vehicle 14 by allowing a driver of the vehicle 14 to specify a desired curvature of the backing path of the trailer 12. The vehicle 14 is embodied as a pickup truck that is pivotally attached to one embodiment of the trailer 12 that has a box frame 16 with an enclosed cargo area 18, a single axle 20 operably coupled to wheels 22 and 24, and a tongue 26 longitudinally extending forward from the enclosed cargo area 18. The illustrated trailer 12 also has a trailer hitch connector in the form of a coupler assembly 28 that is connected to a vehicle hitch connector in the form of a hitch ball 30 and drawbar 31. The coupler assembly 28 latches onto the hitch ball 30 to provide a pivoting hitch point 32 that allows for articulation of a hitch angle between the vehicle 14 and the trailer 12. As defined herein, the hitch angle corresponds to the angle formed between the center longitudinal axis of the vehicle 14 and of the trailer 12 (see hitch angle γ; FIG. 17). It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

The trailer backup assist system 10 also includes an imaging device 34 located at the rear of the vehicle 14 and configured to image a rear-vehicle scene. The imaging device 34 may be centrally located at an upper region of a vehicle tailgate 35 such that the imaging device 34 is elevated relative to the tongue 26 of the trailer 12. The imaging device 34 has a field of view 36 located and oriented to capture one or more images that may include the tongue 26 of the trailer 12 and the hitch ball 30, among other things. Captured images are supplied to a controller 38 of the trailer backup assist system 10 and are processed by the controller 38 to determine the hitch angle between the vehicle 14 and the trailer 12, as will be described in greater detail herein. The controller 38 is configured with a microprocessor 40 and/or other analog and/or digital circuitry for processing one or more logic routines stored in a memory 42. The logic routines may include one or more hitch angle detection routines 44 and operating routines 46. Information from the imaging device 34 or other components of the trailer backup assist system 10 can be supplied to the controller 38 via a communication network of the vehicle 14, which can include a controller area network (CAN), a local interconnect network (LIN), or other conventional protocols used in the automotive industry. It should be appreciated that the controller 38 may be a stand-alone dedicated controller or may be a shared controller integrated with the imaging device 34 or other component of the trailer backup assist system 10 in addition to any other conceivable onboard or off-board vehicle control systems.

With respect to the present embodiment, the controller 38 of trailer backup assist system 10 may be configured to communicate with a variety of vehicle equipment. The trailer backup assist system 10 may include a vehicle sensor module 48 that monitors certain dynamics of the vehicle 14. The vehicle sensor module 48 may generate a plurality of signals that are communicated to the controller 38 and may include a vehicle speed signal generated by a speed sensor 50 and a vehicle yaw rate signal generated by a yaw rate sensor 52. A steering input device 54 may be provided to enable a driver to control or otherwise modify the desired curvature of the backing path of the trailer 12. The steering input device 54 may be communicatively coupled to the controller 38 in a wired or wireless manner and provides the controller 38 with information defining the desired curvature of the backing path of the trailer 12. In response, the controller 38 processes the information and generates corresponding steering commands that are supplied to a power assist steering system 56 of the vehicle 14. In one embodiment, the steering input device 54 includes a rotatable knob 58 operable between a number of rotated positions that each provide an incremental change to the desired curvature of the backing path of the trailer 12.

According to one embodiment, the controller 38 of the trailer backup assist system 10 may control the power assist steering system 56 of the vehicle 14 to operate the steered wheels 60 of the vehicle 14 for moving the vehicle 14 in such a manner that the trailer 12 reacts in accordance with the desired curvature of the backing path of the trailer 12. The power assist steering system 56 may be an electric power-assisted steering (EPAS) system that includes an electric steering motor 62 for turning the steered wheels 60 to a steering angle based on a steering command generated by the controller 38, whereby the steering angle may be sensed by a steering angle sensor 64 of the power assist steering system 56 and provided to the controller 38. The steering command may be provided for autonomously steering the vehicle 14 during a backup maneuver and may alternatively be provided manually via a rotational position (e.g., a steering wheel angle) of a steering wheel 66 or the rotatable knob 58. However, in some embodiments, the steering wheel 66 of the vehicle 14 may be mechanically coupled with the steered wheels 60 of the vehicle 14, such that the steering wheel 66 moves in concert with steered wheels 60 via an internal torque, thereby preventing manual intervention with the steering wheel 66 during autonomous steering of the vehicle 14. In such instances, the power assist steering system 56 may include a torque sensor 68 that senses torque (e.g., gripping and/or turning) on the steering wheel 66 that is not expected from autonomous control of the steering wheel 66 and therefore indicative of manual intervention by the driver. In some embodiments, external torque applied to the steering wheel 66 may serve as a signal to the controller 38 that the driver has taken manual control and for the trailer backup assist system 10 to discontinue autonomous steering functionality.

The controller 38 of the trailer backup assist system 10 may also communicate with a vehicle brake control system 70 of the vehicle 14 to receive vehicle speed information such as individual wheel speeds of the vehicle 14. Additionally or alternatively, vehicle speed information may be provided to the controller 38 by a powertrain control system 72 and/or the speed sensor 50, among other conceivable means. It is conceivable that individual wheel speeds may be used to determine a vehicle yaw rate, which can be provided to the controller 38 in the alternative, or in addition to, the vehicle yaw rate measured by yaw rate sensor 52 of the vehicle sensor module 48. In some embodiments, the controller 38 may provide braking commands to the vehicle brake control system 70, thereby allowing the trailer backup assist system 10 to regulate the speed of the vehicle 14 during a backup maneuver of the trailer 12. It should be appreciated that the controller 38 may additionally or alternatively regulate the speed of the vehicle 14 via interaction with the powertrain control system 72.

Through interaction with the power assist steering system 56, the vehicle brake control system 70, and/or the powertrain control system 72 of the vehicle 14, the potential for unacceptable trailer backup conditions can be reduced. Examples of unacceptable trailer backup conditions include, but are not limited to, a vehicle over-speed condition, a high hitch angle rate, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the controller 38 of the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition.

According to one embodiment, the controller 38 may communicate with one or more devices, including a vehicle alert system 74, which may prompt visual, auditory, and tactile warnings. For instance, vehicle brake lights 76 and vehicle emergency flashers may provide a visual alert and a vehicle horn 78 and/or speaker 80 may provide an audible alert. Additionally, the controller 38 and/or vehicle alert system 74 may communicate with a human machine interface (HMI) 82 of the vehicle 14. The HMI 82 may include a touchscreen vehicle display 84 such as a center-stack mounted navigation or entertainment display capable of displaying images indicating the alert. Such an embodiment may be desirable to notify the driver of the vehicle 14 that an unacceptable trailer backup condition is afoot. Further, it is contemplated that the controller 38 may communicate via wireless communication with one or more electronic portable devices such as portable electronic device 86, which is embodied as a smartphone. The portable electronic device 86 may include a display 88 for displaying one or more images and other information to a user. In response, the portable electronic device 86 may provide feedback information, such as visual, audible, and tactile alerts.

Figure 3:
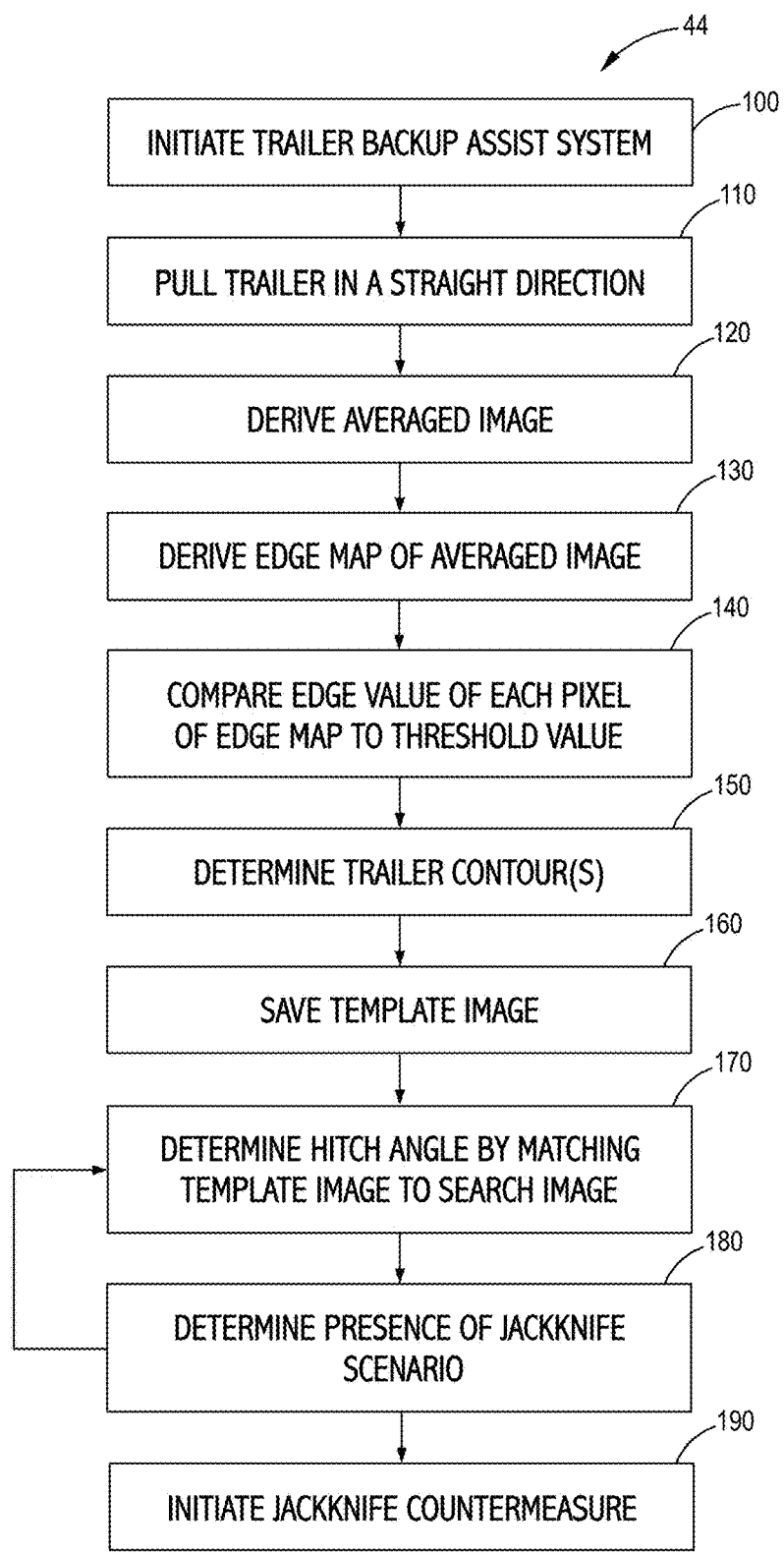
FIG. 3 is a flow diagram of a method of detecting a hitch angle, according to one embodiment.

Referring to FIG. 3, a method of detecting hitch angle is illustrated. The method, also referred to herein as "the template matching method," may be executed by the controller 38 of the trailer backup assist system 10 and is shown as one embodiment of the hitch angle detection routine 44. The template matching method generally includes processing image information to distinguish trailer contour from ground noise in images captured by the imaging device 34. The trailer contour then serves as a template and is matched to a search image to determine the hitch angle between the vehicle 14 and the trailer. 12

Figure 4:
FIG. 4 is a captured image showing a trailer in straight alignment with a vehicle and the presence of ground noise.
Figure 5:
FIG. 5 is an edge map of the captured image shown in FIG. 4.

For purposes of illustration, a captured image 90 is exemplarily shown in FIG. 4 illustrating the trailer 12 in straight alignment with the vehicle 14 and the presence of ground noise. As defined herein, ground noise generally corresponds to any ground structure capable of interfering with image acquisition of the trailer 12. With respect to the captured image 90, potential ground noise candidates may include large stones (e.g., stone 92) and irregular ground surfaces (e.g., ground surface 94). As such, it may be difficult to accurately identify the trailer 12 when an image acquisition technique, namely edge detection, is applied to the captured image 90, as exemplarily shown in FIG. 5. With these things in mind, the template matching method described herein is able to blur out ground noise to enable identification of one or more trailer contours. Once identified, the trailer contour(s) may be stored as a template image that is matched to a search image to determine the hitch angle between the vehicle 14 and the trailer 12. In practice, the method has been found highly robust and benefits from relatively fast and straightforward computations.

Figure 6:
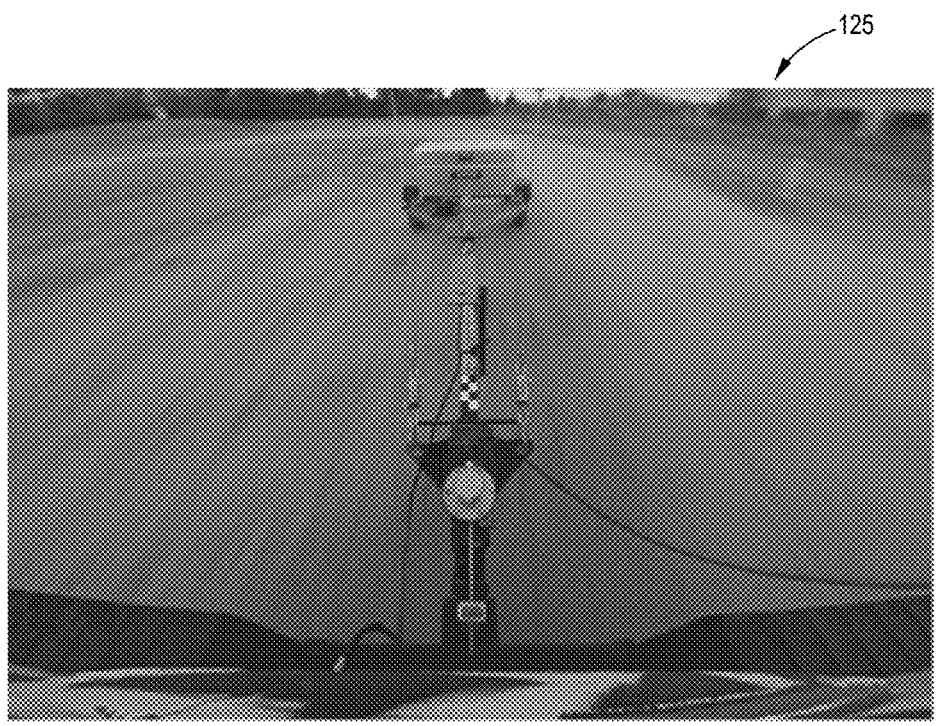
FIG. 6 illustrates the blurring of ground noise in an averaged image.

The template matching method may begin at step 100, where the driver or other occupant initiates the trailer backup assist system 10. This may be achieved via user-input made through the display 84 of the vehicle 14 or other conceivable means. At step 110, the driver is instructed to pull the trailer 12 in a straight direction such that the hitch angle between the vehicle 14 and the trailer 12 is substantially zero. While the vehicle 14 and trailer 12 are engaged in the straight pull maneuver, the controller 38 derives an averaged image of all images captured by the imaging device 34 during a period of time at step 120. It has been discovered that 1-3 seconds typically suffices. Notably, the trailer 12 appears stationary within the images captured by the imaging device 34 whereas ground noise constantly changes from image to image. Thus, with respect to the averaged image, pixels associated with the trailer 12 will keep their contrast whereas pixels associated with ground noise will be blurred. To illustrate this effect, an averaged image 125 is exemplarily shown in FIG. 6.

Figure 7:
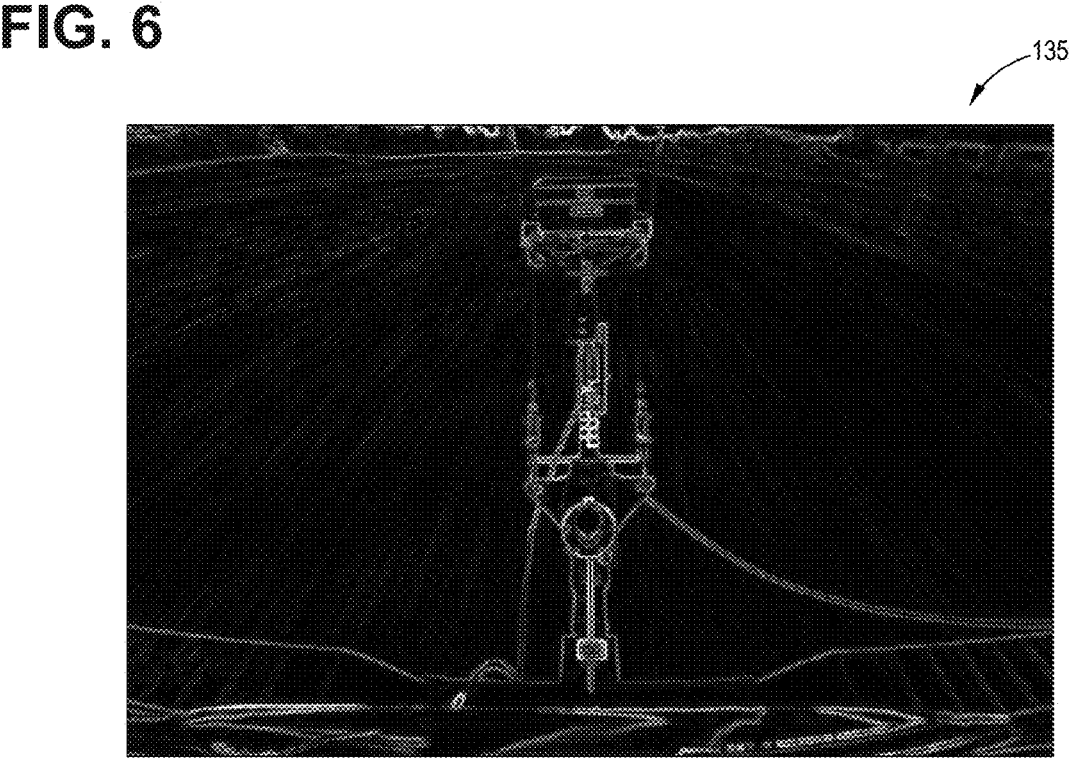
FIG. 7 is an edge map of the averaged image shown in FIG. 6.
Figure 8:
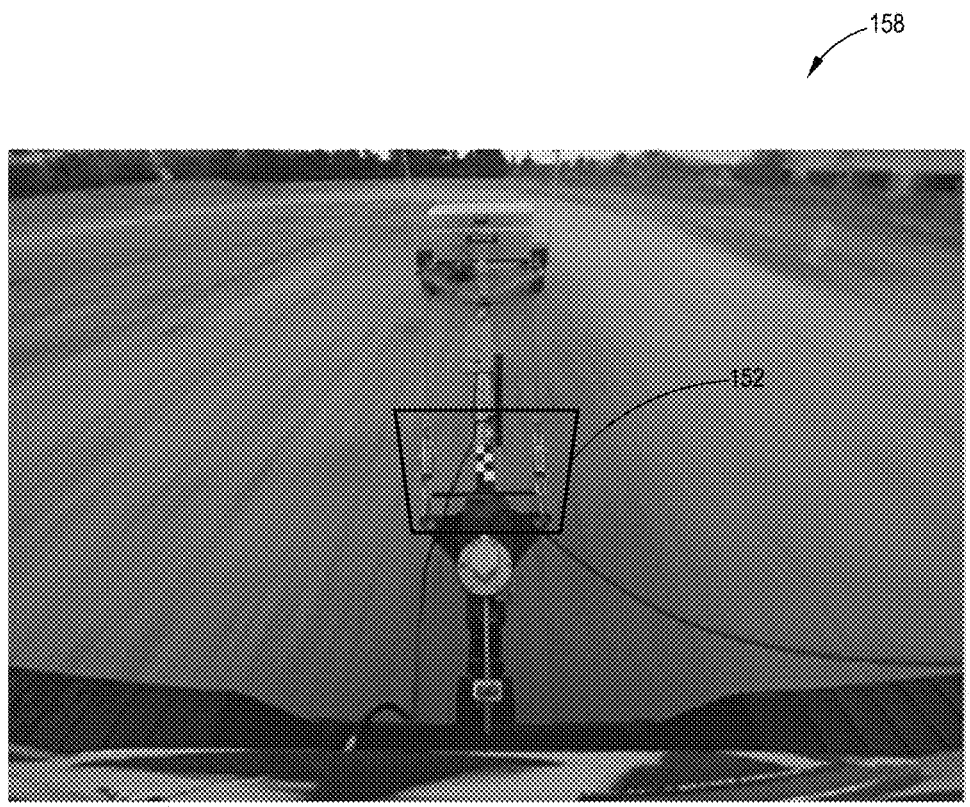
FIG. 8 illustrates a trailer contour of a template image.

At step 130, the controller 38 derives an edge map of the averaged image by calculating the intensity gradient for each pixel of the averaged image 125. The intensity gradient, or edge value, of each pixel may range from 0 to 255. For purposes of illustration, an edge map 135 is exemplarily shown in FIG. 7, in which the edge values of pixels associated with ground noise have been substantially weakened due to the blurring effect. At step 140, the controller 38 compares the edge value of each pixel of the edge map 135 to a threshold value (e.g., 30). Pixels having an edge value meeting or exceeding the threshold value are identified as trailer pixels whereas pixels having an edge value not meeting or exceeding the threshold value are identified as ground noise pixels. Once the trailer pixels have been identified, the controller 38 determines one or more trailer contours at step 150. The trailer contour(s) are saved to the memory 42 of the controller 38 as a template image at step 160 and may include a substantial entirety of the imaged trailer 12 or portions thereof. For purposes of illustration, a trailer contour 152 is shown in FIG. 8. As shown, the trailer contour 152 has a square shape, which is generally more computationally efficient. In its current position, the trailer contour 152 may serve as a zero hitch angle reference and enables the hitch angle between the vehicle 14 and the trailer 12 to be determined in subsequent images (i.e., search images) via template matching at step 170.

Figure 9:
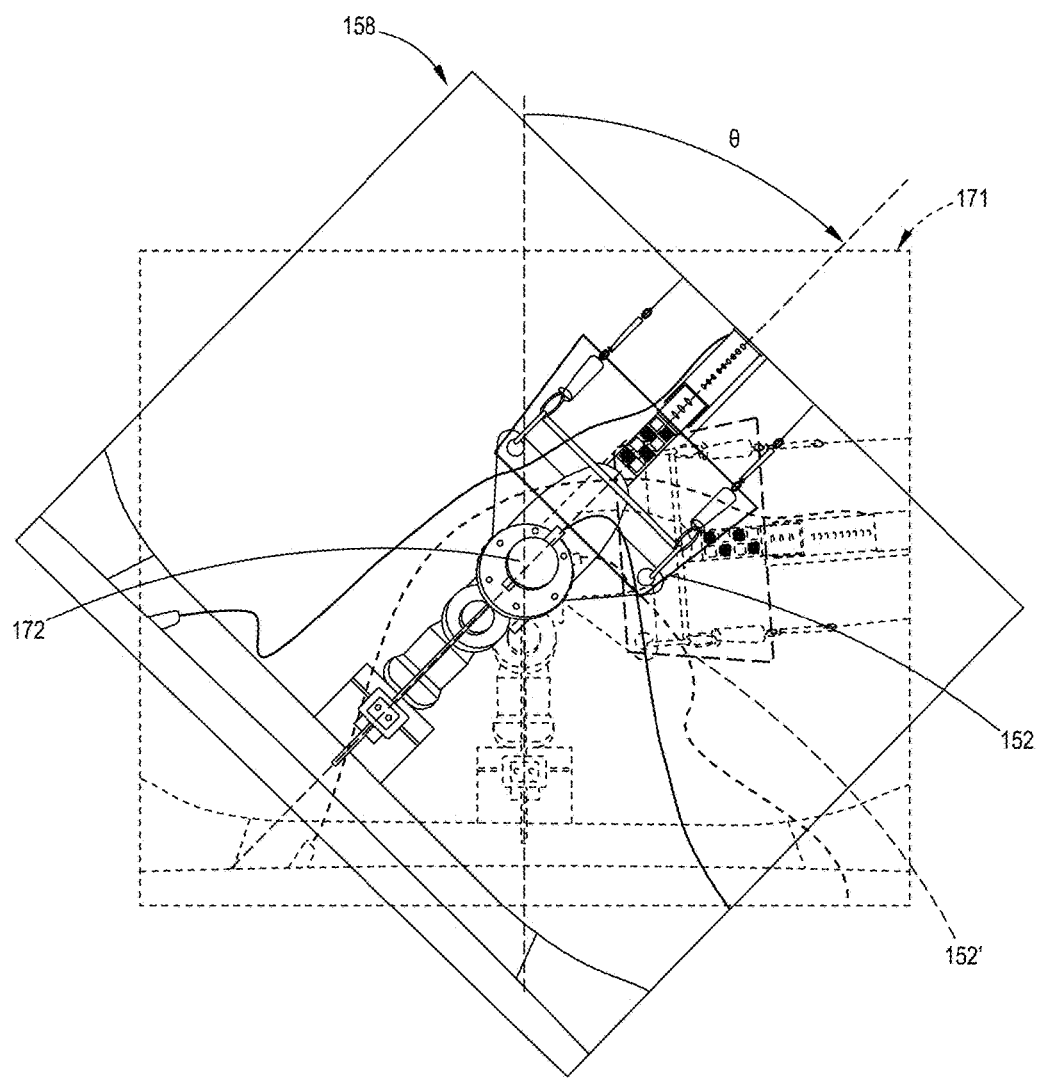
FIG. 9 illustrates a template image being matched to a search image to determine a hitch angle.

According to one embodiment, as shown in FIG. 9, the hitch angle between the vehicle 14 and the trailer 12 may be determined based on a positional relationship between a template image 158 and a search image 171. More specifically, the hitch angle may be determined by superimposing the template image 158 over the search image 171 such that the template image 158 is initially in a zero hitch angle position and subsequently rotating the template image 158 about a rotation point, preferably the imaged hitch point 172. The direction of rotation can be predicted based on information received from the steering angle sensor 64 or other sensors from which an initial assessment can be made concerning the angular position of the trailer 12 relative to the vehicle 14. Once the template image 158 has been matched to the search image 171, the angle $\theta$ at which the template image 158 is rotated relative to the zero hitch angle position can be correlated to the hitch angle between the vehicle 14 and the trailer 12.

Figure 10:
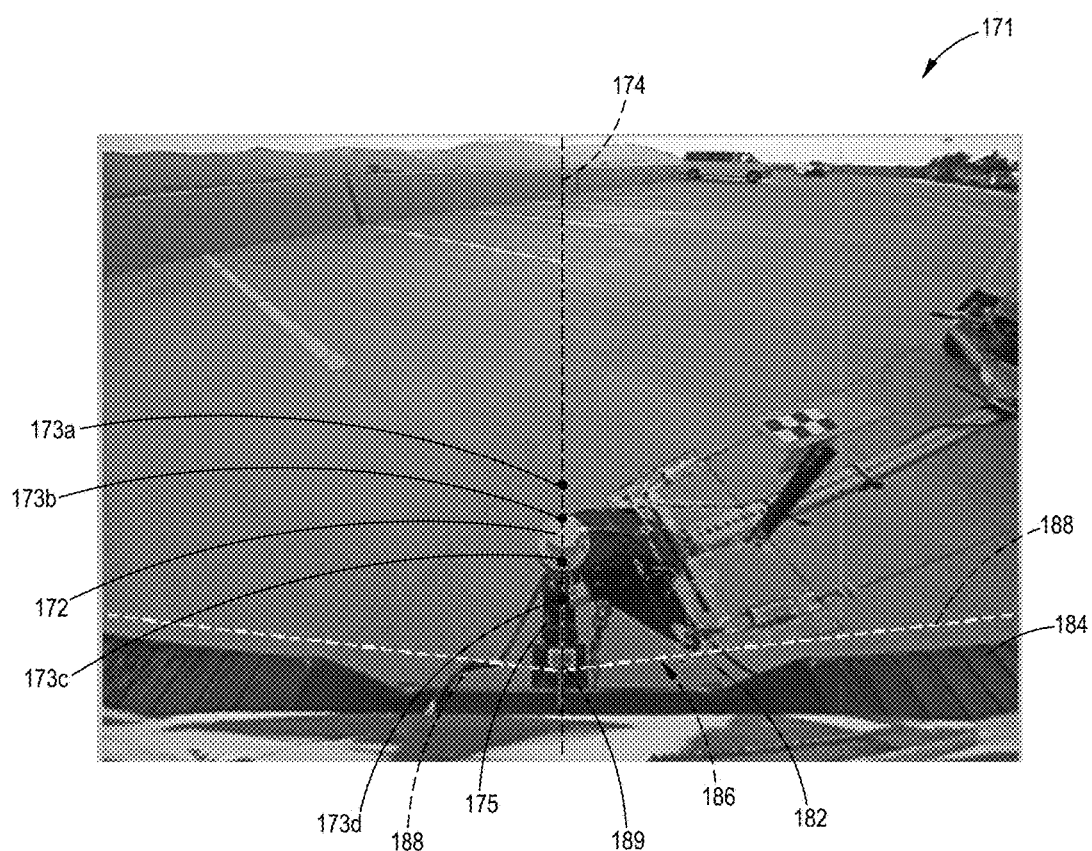
FIG. 10 is a search image having a proximity zone for jackknife detection and a number of candidate hitch point locations about which a template image can be rotated to determine an actual imaged hitch point and a hitch angle.

According to one embodiment, the imaged hitch point 172 may be determined through process of elimination. For instance, as exemplarily shown in FIG. 10, the controller 38 may define a number of candidate hitch point locations 173a-173d that are positioned along a reference line 174 that extends vertically across the middle column of the search image 171. The reference line 174 is defined by the controller 38 and is assumed to coincide with the center longitudinal axis of an imaged drawbar 175 and intersect with the hitch point 172 of the imaged vehicle 14 and trailer 12. The candidate hitch point locations 173a-173d are shown evenly spaced along the reference line 174 but may vary in number and spacing in other embodiments. Once the template image 158 has been derived and the vehicle 14 and trailer 12 are moving along a curved path, the controller 38 may superimpose the template image 158 onto the search image 171 at the zero hitch angle position and rotate the template image 158 about each of the candidate hitch point locations 173a-173d in an attempt to match the template image 158 with the search image 171. Based on the match quality, a confidence score is given to each candidate hitch point location 173a-173d and the candidate hitch point location 173a-173d receiving the highest confidence score is selected as the hitch point. In the event the matching quality associated with each candidate hitch point location 173a-173d is below a predetermined threshold, the controller 38 may define additional candidate hitch point locations (not shown) along the reference line 174 in either or both directions of the candidate hitch point location 173a-173d that received the highest confidence score and execute template matching with respect to each of the additional candidate hitch point locations. This process may be iterated as many times as needed until the predetermined threshold has been met. In so doing, the location of the candidate hitch point location that is ultimately selected as the imaged hitch point will closely mirror the location of the actual hitch point 172.

While matching the template image 158 to the search image 171, the controller 38 may additionally determine the presence of an imminent jackknife scenario at step 180. With continued reference to FIG. 10, the displacement of the template image 158 may be monitored relative to a proximity zone 182 while the template image 158 is rotated about the rotation point. In the illustrated embodiment, the proximity zone 182 may be defined as the space between an imaged rear bumper 184 of the vehicle 14 and a boundary line 186 that is defined by the controller 38 and overlaid onto the search image 171. The boundary line 186 may be v-shaped and includes a pair of straight segments 188 extending outwardly at an angle from a point 189 that is located on the reference line 174 and is disposed between the imaged hitch point 172 and the imaged rear bumper 184. It should be appreciated that the boundary line 186 may assume other shapes in alternative embodiments. The location and shape of the boundary line 186 may be determined based on various considerations such as, but not limited to, vehicle speed, trailer length, drawbar length, imager characteristics, trailer contour, and vehicle contour. It is generally assumed that vehicle speed, trailer length, drawbar length, and image characteristics are known or may be otherwise measured and inputted to the trailer backup assist system 10. Vehicle contour, such as that of the imaged rear bumper 184, may be programmed at the factory.

In the event the template image 158 crosses into the proximity zone 182 of the search image 171, the controller 38 determines that an imminent jackknife scenario is present and initiates a jackknife countermeasure at step 190. Otherwise, if it is determined that an imminent jackknife scenario is not present, the controller 38 may continue to determine the hitch angle between the vehicle 14 and the trailer 12, as discussed previously with respect to step 170. The jackknife countermeasure may include generating an auditory warning via the vehicle alert system 74, generating a visual warning via the display 84, generating a braking command to the vehicle brake control system 70, reducing the torque of the powertrain control system 72, modifying the steering angle of the vehicle 14, or a combination thereof in addition to any other conceivable countermeasures. Since the trailer 12 will likely be in motion upon the controller 38 determining that an imminent jackknife scenario is present, it is generally desirable to locate and dimension the proximity zone 182 in a manner that provides sufficient time for a jackknife scenario to be detected and a countermeasure to be implemented, thereby minimizing the potential of an actual jackknifing and/or collision between the trailer 12 and the vehicle 14. Doing so also overcomes any response latency that may be inherent in the trailer backup assist system 10. While steps 170 and 180 have been illustrated in a linear fashion, it should be appreciated that both steps may be performed simultaneously.

Figure 11:
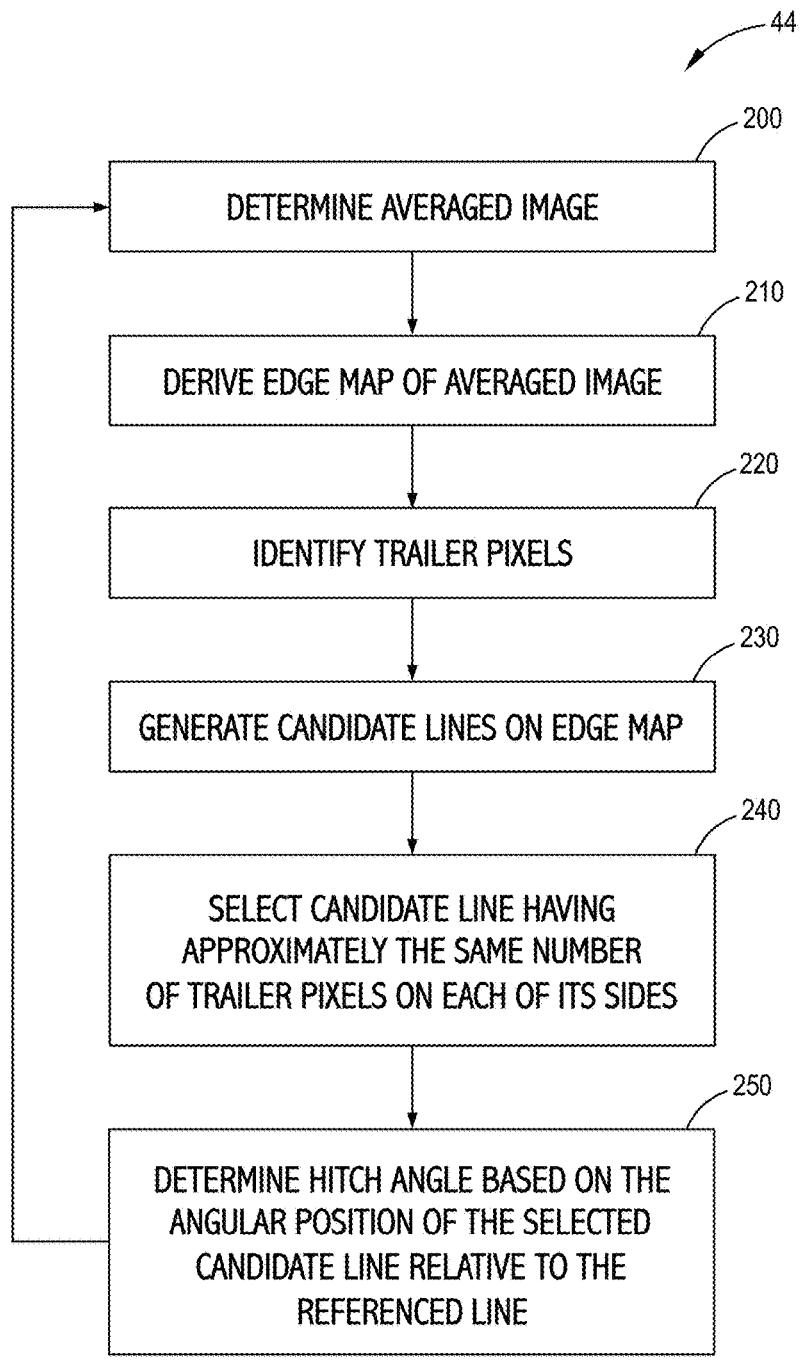
FIG. 11 is a flow diagram of a method of detecting a hitch angle, according to another embodiment.

Referring to FIG. 11, another method of detecting hitch angle is illustrated. The method, also referred to herein as "the centerline method," may be executed by the controller 38 of the trailer backup assist system 10 and is exemplarily shown as one embodiment of the hitch angle detection routine 44. The centerline method also utilizes image information obtained by processing images captured by the imaging device 34 to determine the hitch angle between the vehicle 14 and the trailer 12. The centerline method differs from the template matching method in that the vehicle 14 and the trailer 12 need not be moving a straight direction prior to hitch angle detection, thus making the centerline method particularly useful in instances where no template image is available for the trailer 12 and the driver is prevented from pulling the trailer 12 in a straight line. When compared to the template matching method, the centerline method generally benefits from faster processing times, but is also generally less reliable. Therefore, it can be said that the centerline method provides a quick start to hitch angle detection and may be replaced at a later time by the template matching method or other suitable methods providing more reliable hitch angle measurements. Thus, for purposes of illustration, the centerline method will be described in greater detail below under the condition that no template image is available and that the vehicle 14 and trailer 12 are initially moving along a curved path.

Figure 12:
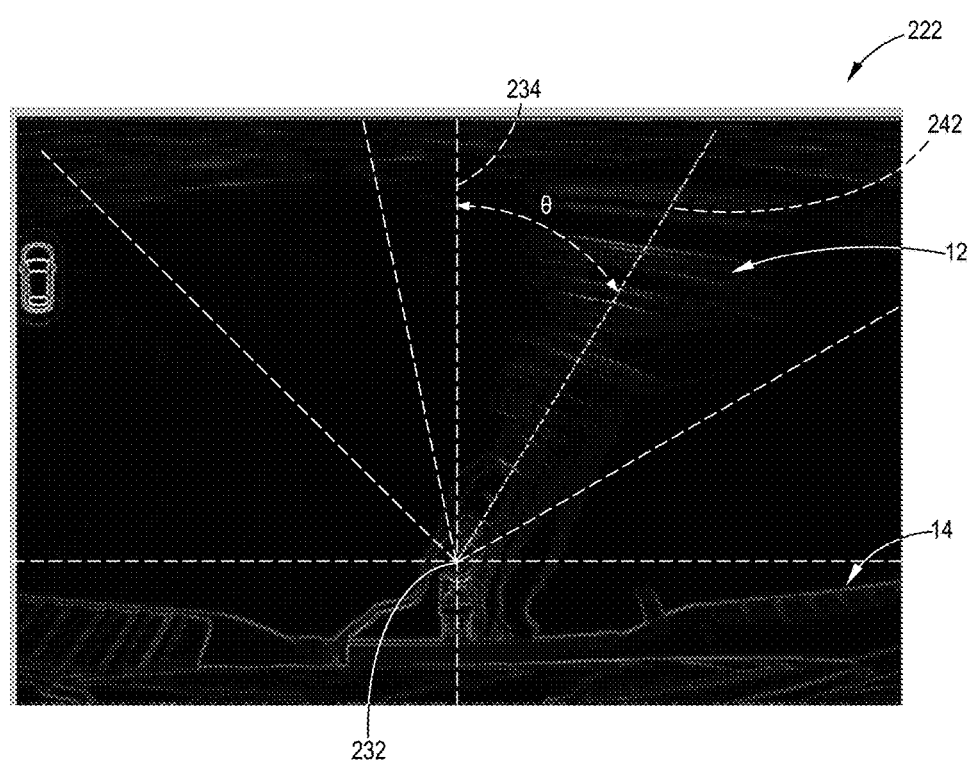
FIG. 12 is an edge map of a captured image showing a number of candidate lines, one of which, is selected to determine a hitch angle based on its angular position relative to a reference line.

The centerline method may begin at step 200, where the controller 38 processes successive images captured by the imaging device 34 to derive an averaged image. At step 210, the controller 38 derives an edge map by calculating an intensity gradient, or edge value, for each pixel in the averaged image. At step 220, the controller 38 identifies trailer pixels in the edge map by comparing the edge value of each pixel to a threshold value and selecting only those pixels meeting or exceeding the threshold value to correspond to trailer pixels. For purposes of illustration, an edge map 222 is exemplarily shown in FIG. 12, wherein one embodiment of the imaged trailer 12 appears slightly blurred as a result of angular displacement of the trailer 12 relative to the vehicle 14. It is contemplated that additional threshold values may be used to differentiate between trailer pixels and vehicle pixels since vehicle pixels will generally have a higher degree of contrast relative to trailer pixels due to the blurring of the trailer 12. At step 230, the controller 38 defines a number of candidate lines on the edge map 222, as exemplarily shown in FIG. 12. The candidate lines project outwardly from a common projection point, preferably the imaged hitch point 232. The direction at which the candidate lines project may vary based on a width of the rear bumper of the vehicle 14, a length of the drawbar of the vehicle 14, and a length of the tongue of the trailer 12. In the illustrated embodiment, the candidate lines may vary from −90 degrees to 90 degrees with respect to a reference line 234 that is indicative of a predetermined hitch angle (e.g., a zero hitch angle) and extends vertically across the middle column of the edge map 222 and intersects the imaged hitch point 232. While the exact location of the imaged hitch point 232 may be unknown initially, the controller 38 may assign a default projection point from which to project the candidate lines. Since it's assumed the hitch point 232 will typically be located along the reference line 234 and usually falls within a predictable range (e.g., 10-20 centimeters from the rear bumper of the vehicle 14), the selection of a default projection point meeting the foregoing criteria is generally sufficient for the purposes of initial hitch angle detection.

At step 240, the controller 38 selects the candidate line (e.g., candidate line 242) having approximately the same number of trailer pixels on each of its sides, or said differently, the candidate line, or centerline, about which the trailer pixels are substantially symmetric. Once the controller 38 has made a candidate line selection, the controller 38 may determine the hitch angle between the vehicle 14 and the trailer 12 based on the angular position of the selected candidate line 242 relative to the reference line 234 at step 250. More specifically, the angle θ between the selected candidate line 242 and the reference line 234 can be correlated to the hitch angle between the vehicle 14 and the trailer 12. As the vehicle 14 and trailer 12 continue along its course, steps 200-250 may be iterated with subsequent images captured by the imaging device 34 to continually provide hitch angle measurements.

Figure 13:
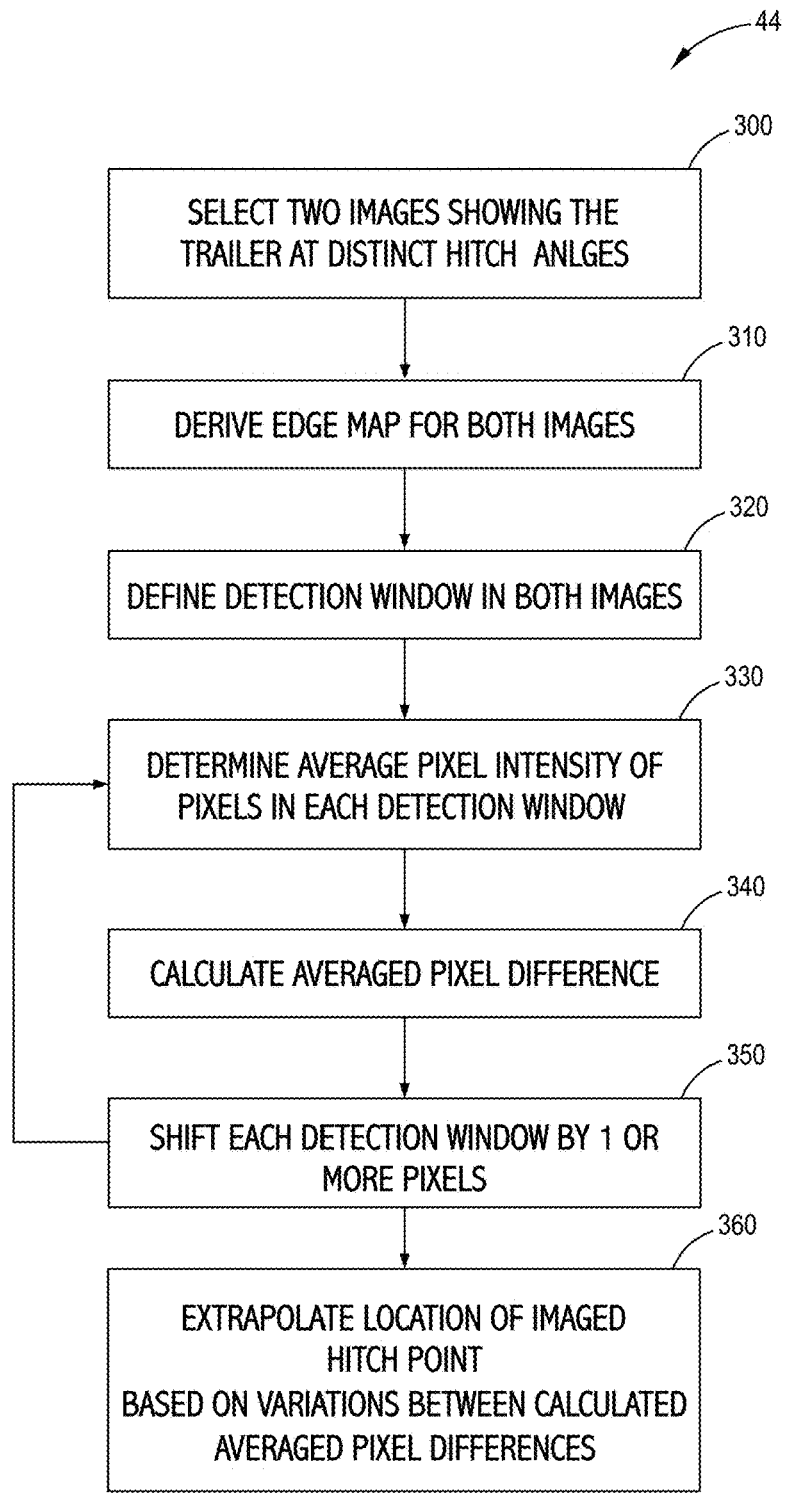
FIG. 13 is a flow diagram of a method of locating an imaged hitch point, according to one embodiment.

Referring to FIG. 13, a method of locating an imaged hitch point in images captured by the imaging device 34 is illustrated. The method, also referred to herein as "the drawbar scan method," may be executed by the controller 38 of the trailer backup assist system 10 and may be embodied as a subroutine of the hitch angle detection routine 44. The drawbar scan method generally requires the trailer 12 to be moving relative to the vehicle 14 at a non-zero hitch angle in order to identify an imaged hitch point. As such, the drawbar scan method may be executed to provide a suitable rotation point or projection point when executing the centerline method or the template matching method in instances where the vehicle 14 and trailer 12 are moving along a curved path. By identifying the imaged hitch point, more accurate hitch angle measurements can be achieved.

Figure 14:
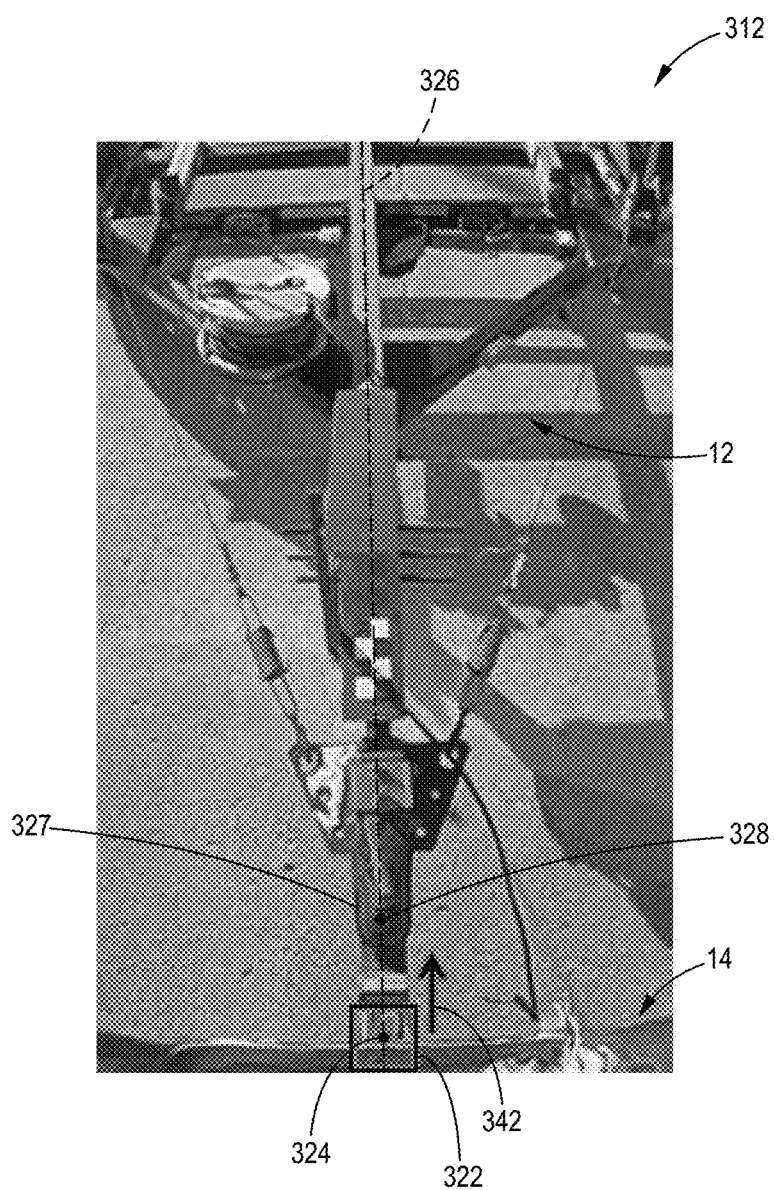
FIGS. 14 and 15 are each captured images in which a trailer appears at a distinct hitch angle and a detection window is used to scan an imaged drawbar to locate an imaged hitch point.
Figure 15:
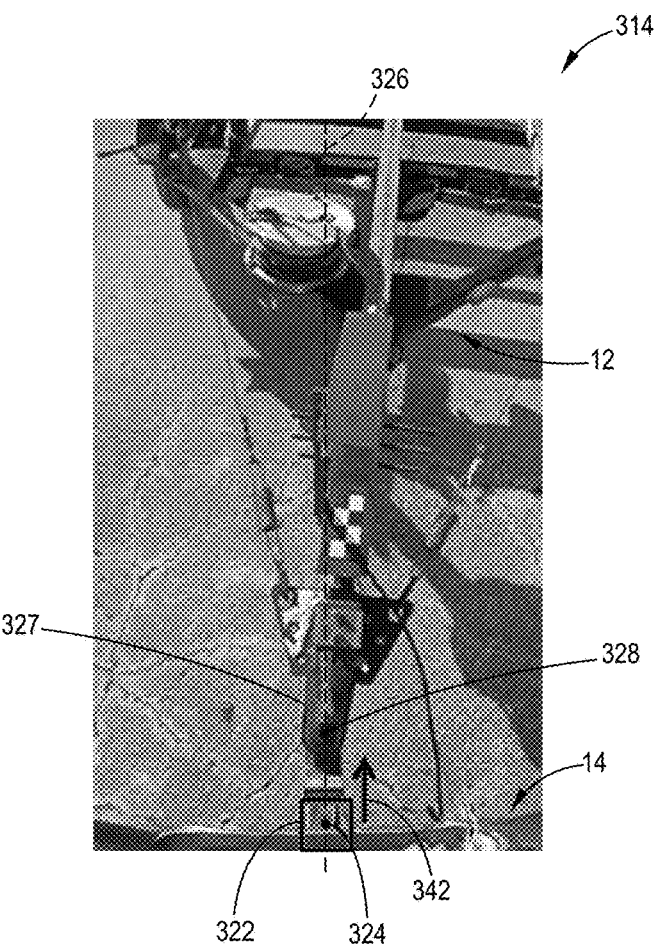

The drawbar scan method generally begins at step 300, where the controller 38 selects two images captured by the imaging device 34 that show the trailer 12 at distinct hitch angles. The two images may be successive or non-successive depending on the frame rate of the imaging device 34. In practice, a noticeable difference in hitch angles between the two images is generally preferred. At step 310, the controller 38 derives an edge map for both images by calculating the intensity gradient, or edge value, for each of their corresponding pixels. For purposes of illustration, FIG. 14 shows a first image 312 in which the hitch angle between the vehicle 14 and the trailer 12 is approximately zero whereas FIG. 15 shows a second image 314 in which the hitch angle between the vehicle 14 and the trailer 12 is approximately 5 degrees relative to the zero hitch angle position shown in FIG. 14. For purposes of clarity, the edge maps associated with both images 312, 314 are not shown. At step 320, the controller 38 defines a detection window 322 of variable height and width in both images 312, 314. Each detection window 322 is centered at a common pixel position, such as pixel position 324, which is located on a reference line 326 that extends vertically across the middle column of the corresponding image 312, 314. The reference line 326 is defined by the controller 38 and is assumed to coincide with the center longitudinal axis of an imaged drawbar 327 and intersect with an imaged hitch point 328 between the vehicle 14 and the trailer 12.

At step 330, the controller 38 determines an average pixel intensity of the pixels bounded by each detection window 322 when centered at the current pixel position, and at step 340, the controller 38 calculates an averaged pixel difference, which is defined herein as the absolute value of the difference between the average pixel intensities, as calculated at step 330. Once the average pixel difference has been calculated, at step 350, the controller 38 shifts each detection window 322 in an upward vertical direction (as specified by arrow 342) so that each detection window 322 is commonly centered at a new pixel position that is 1 or more pixel positions higher on the corresponding reference line 326 than the previous pixel position. Thus, by making multiple iterations of steps 330-350, the controller 38 may calculate averaged pixel differences for when each detection window 322 is commonly centered at a number of pixel positions along the reference line 326. Once this has been done, at step 360, the controller 38 extrapolates the location of the hitch point 328 based on variations in the calculated averaged pixel differences.

Figure 16:
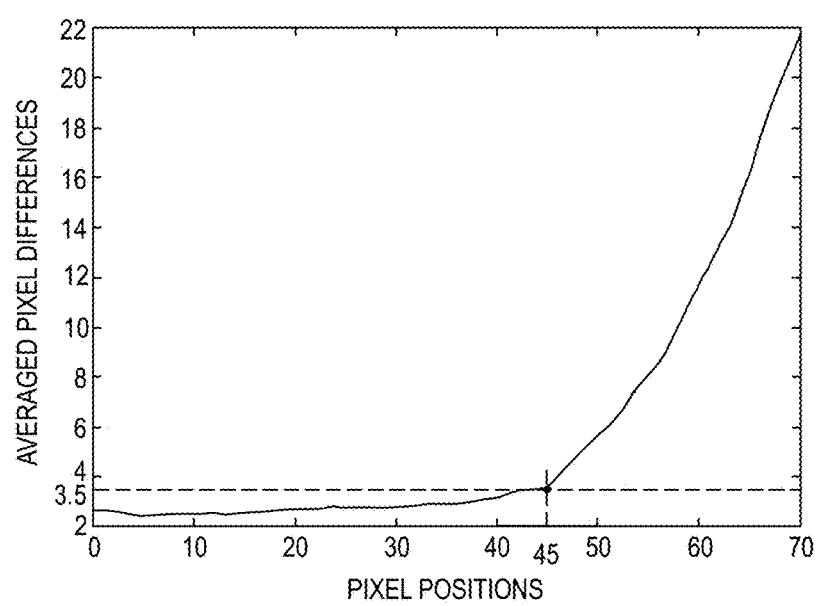
FIG. 16 is a graph illustrating averaged pixel differences for a number of pixel positions common to the captured images shown in FIGS. 14 and 15.

With respect to images 312 and 314, it is generally expected that little variation will occur between the calculated averaged pixel differences associated with pixel positions that coincide with the imaged drawbar 327 due in part to the imaged drawbar 327 appearing in a common fixed position in both images 312, 314. In contrast, it is generally expected that greater variation to occur between the calculated averaged pixel differences associated with pixel positions that are located on portions of the reference line 326 that extend beyond the imaged drawbar 327 due in part to the trailer 12 appearing in different positions in both images 312, 314. For purposes of illustration, a graph is shown in FIG. 16 illustrating calculated averaged pixel differences for a number of pixel positions along the vertical reference line 326. The pixel positions may fall within a predetermined range in which the imaged hitch point 328 is expected to be located, thereby negating the need to determine averaged pixel differences for pixel positions along the vertical reference line 326 that are unlikely to correspond to the imaged hitch point 328.

As shown in FIG. 16, the graph generally demonstrates a relatively constant averaged pixel difference between 2 and 3 when each detection window 322 is commonly centered at pixel positions 0-44 as those pixel positions coincide with the imaged drawbar 327. In contrast the graph in FIG. 16 generally demonstrates a sharp increase in averaged pixel differences when each detection window 322 is commonly centered at pixel positions 46-70 as those pixel positions are located on portions of the reference line 326 that extend past the imaged drawbar 327. Recognizing this, the controller 38 may select, as the imaged hitch point 328, one of the pixel positions (e.g., pixel position 44 or 45) leading up to the sharp increase in averaged pixel differences. According to one embodiment, the controller 38 may iterate steps 330-350 of the drawbar scan method until the averaged pixel difference meets or exceeds a predetermined threshold value (e.g., 3.5) and select, as the imaged hitch point, the pixel position associated with the calculated averaged pixel difference that meets or exceeds the threshold value. This threshold value may be determined based on a number of considerations including, but not limited to, the size of the detection window 322, properties of the imaging device 34, etc. Once identified, the selected imaged hitch point should closely mirror the actual imaged hitch point 328 and may be used for hitch angle detection pursuant to the template matching method or the centerline method.

Referring to FIG. 17, a kinematic model of the vehicle 14 and trailer 12 is shown and serves as the basis for determining hitch angle according to another method, referred to herein as "the steady state method" and described in greater detail below. As shown in FIG. 17, the kinematic model is based on various parameters associated with the vehicle 14 and the trailer 12. These parameters include:

δ: steering angle at steered wheels 60 of the vehicle 14;
α: yaw angle of the vehicle 14;
β: yaw angle of the trailer 12;
γ: hitch angle between the vehicle 14 and the trailer 12 ($\gamma=\beta-\alpha$);
W: wheelbase length between a front axle 370 and a rear axle 372 of the vehicle 14;
L: drawbar length between the hitch point 32 and the rear axle 372 of the vehicle 14;
D: trailer length between the hitch point 32 and axle 20 of the trailer 12 or effective axle for a multiple axle trailer; and
v: vehicle longitudinal speed.

From the kinematic model shown in FIG. 17, the yaw rate of the vehicle 14 may be represented with the following equation:

$$\frac{d\alpha}{dt} = -\frac{v}{W}\tan\delta$$

Furthermore, the yaw rate of the trailer 12 may be represented with the following equation:

$$\frac{d\beta}{dt} = \frac{v}{D}\sin\gamma + \frac{Lv}{DW}\cos\gamma\tan\delta$$

Accordingly, when the yaw rate of the vehicle 14 and the trailer 12 become equal, the hitch angle γ and the steering angle δ will be constant. This condition, referred to herein as "steady state", can occur when a steering command is steadily maintained during a backing maneuver such as when the trailer 12 is reversed in a straight line with the vehicle 14 or when the vehicle 14 and trailer 12 are turning at a constant curvature for at least a threshold period of time or over a threshold distance of motion. Under such steady state driving conditions, the resulting hitch angle γ can be described using the following equation:

$$c = a\cos\gamma + b\sin\gamma$$

This equation can be rewritten as follows:

$$c = a\sqrt{1-\sin^2\gamma} + b\sin\gamma$$

The above equation can be rearranged into quadratic form and rewritten as follows:

$$c^2 - a^2 - 2bc\sin\gamma + (b^2+a^2)\sin\gamma = 0$$

Solving the quadratic equation for the hitch angle γ yields the following hitch angle equation:

$$\gamma = \arcsin\frac{bc \pm a\sqrt{b^2+a^2-c^2}}{b^2+a^2}$$

Where, $$c = -\frac{1}{W}\tan\delta$$

$$b = \frac{1}{D}$$

$$a = \frac{L}{DW}\tan\delta$$

Accordingly, for a particular vehicle and trailer combination, the trailer length D, the wheelbase length W, and the drawbar length L are constant and assumed known. Thus, when the steady state condition is satisfied, the hitch angle γ between the vehicle 14 and trailer 12 may be determined as a function of the trailer length D, the wheelbase length W, the drawbar length L, and the steering angle δ.

Figure 18:
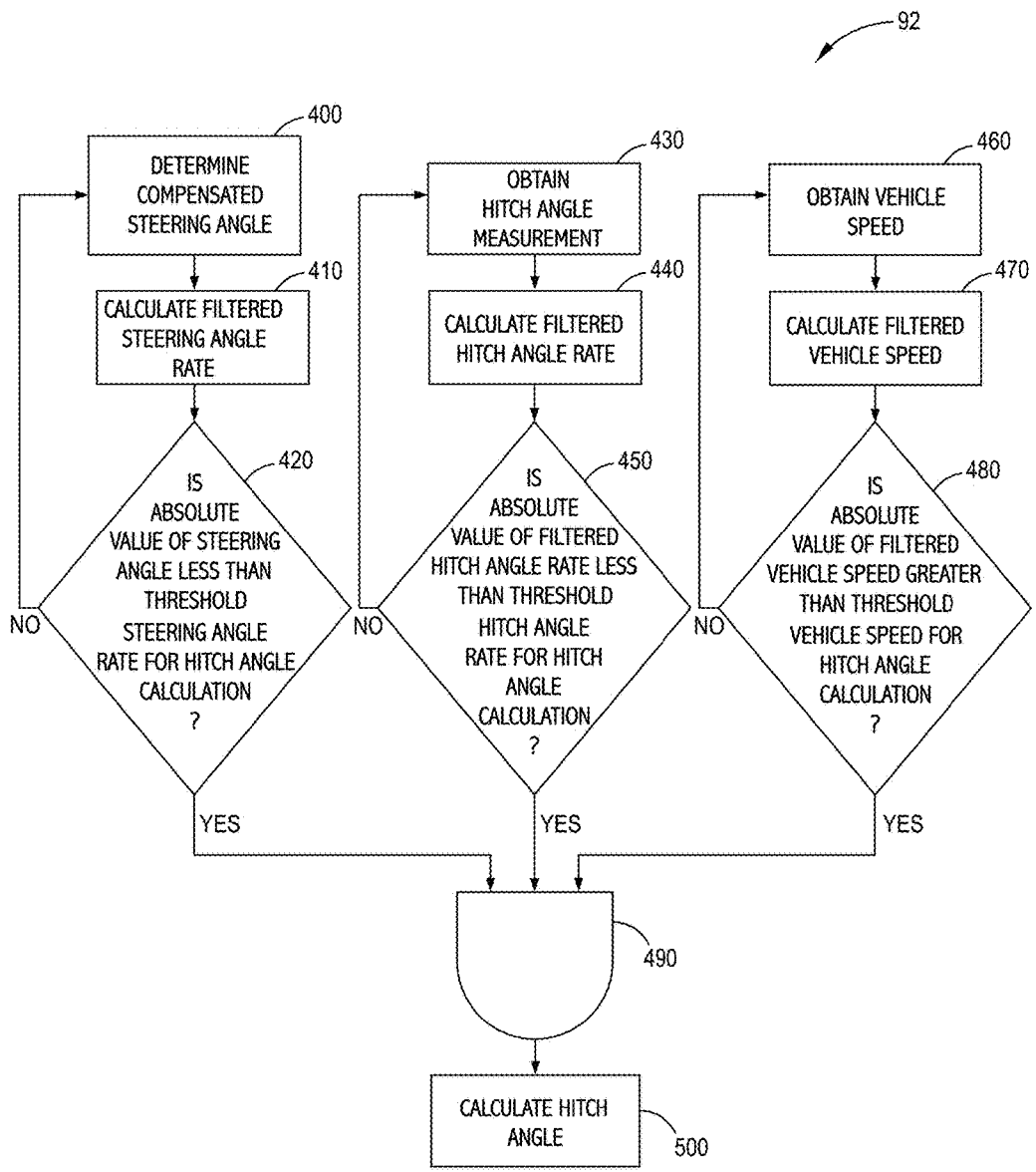
FIG. 18 is a flow diagram of a method of detecting a hitch angle, according to yet another embodiment.

Referring to FIG. 18, the steady state method is shown according to one embodiment. The steady state method may be executed by the controller 38 of the trailer backup assist system 10 and is exemplarily shown as one embodiment of the hitch angle detection routine 44. The method includes determining a steering angle at step 400. The steering angle may be provided by the steering angle sensor 64 and may be compensated to remove any offsets associated therewith. Next, at step 410, a steering angle rate is calculated and is filtered to remove noise. At step 420, it is determined whether the absolute value of the filtered steering angle rate is less than a threshold steering angle rate (e.g., 0.5 degrees per second) required for hitch angle calculation. The method also includes obtaining a hitch angle between the vehicle 14 and trailer 12, as measured pursuant to any of the hitch angle detection methods described herein (e.g., the centerline method) at step 430. At step 440, the controller 38 calculates a filtered hitch angle rate and determines at step 450 whether the absolute value of the filtered hitch angle rate is less than a threshold hitch angle rate (e.g., 0.5 degrees per second) required for hitch angle calculation. The method further includes obtaining a vehicle speed (e.g., from speed sensor 50) at step 460, calculating a filtered vehicle speed at step 470, and then determining at step 480 whether the absolute value of the filtered vehicle speed is greater than a threshold vehicle speed (e.g., 3 kilometers per second) required for hitch angle calculation. If the conditions specified at steps 420, 450, and 480 are met at step 490, the controller 38 determines that the steady state condition has been satisfied and calculates a hitch angle at step 500 using the hitch angle equation described herein with respect to the kinematic model shown in FIG. 17. So long as the steady state condition is satisfied, the controller 38 may continue to determine hitch angle via the hitch angle equation.

Figure 19:
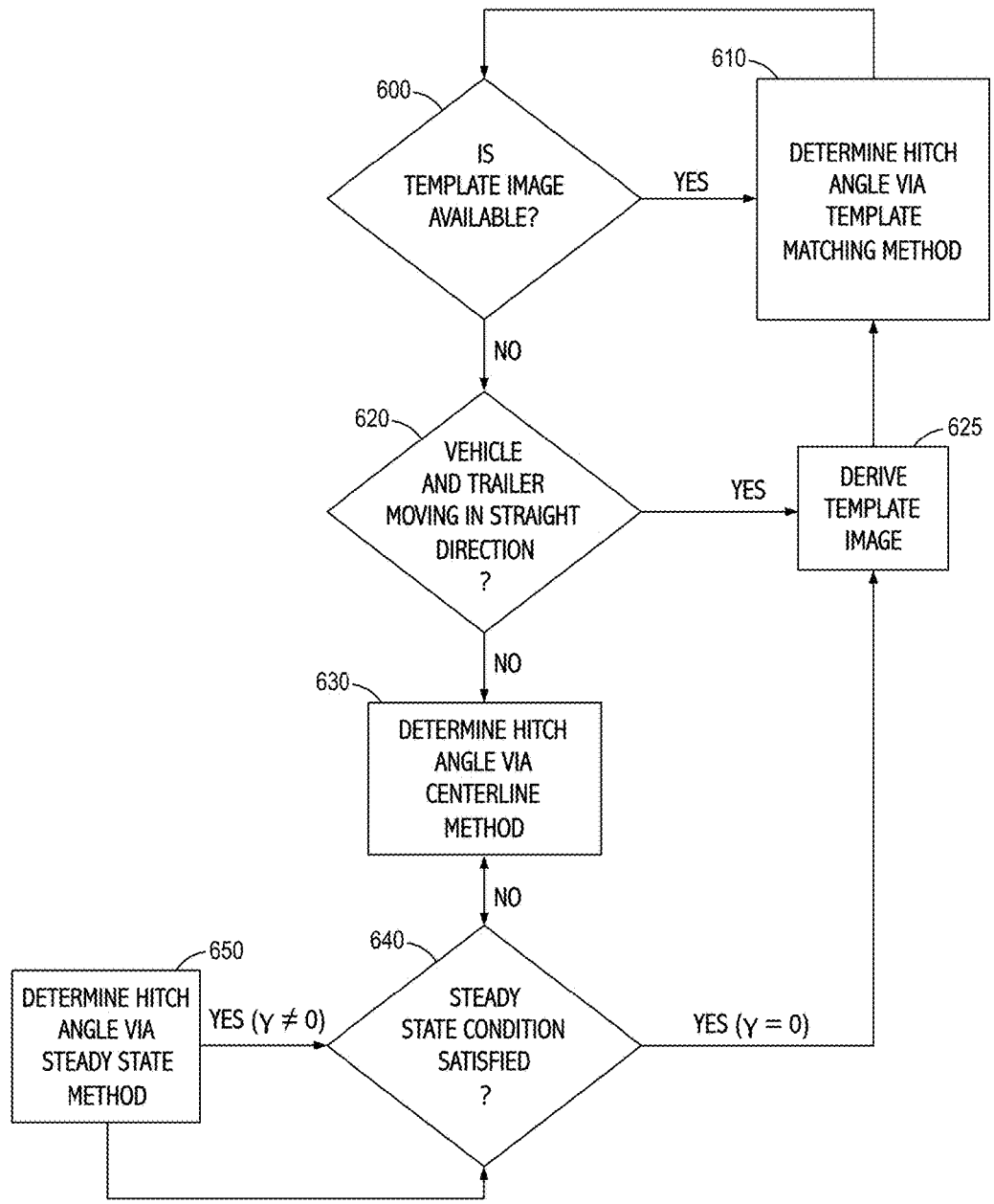
FIG. 19 is a flow diagram of a method of initializing hitch angle detection, according to one embodiment.

Referring to FIG. 19, a method of initializing hitch angle detection is illustrated. The method, referred to herein as the "hitch angle initialization method," may be executed by the controller 38 of the trailer backup assist system 10 and is exemplarily shown as one embodiment of the operating routine 46. The hitch angle initialization method includes selecting between the various hitch angle detection methods described previously herein, which include the template matching method, the centerline method, and the steady state method, for the purposes of hitch angle detection. As described in greater detail below, the foregoing hitch angle detection methods generally vary in processing time and reliability. Thus, the hitch angle initialization method is executed in a manner such that the "best available" hitch angle method is chosen based on considerations including the availability of a template image for the trailer 12 being towed and current driving conditions.

The hitch angle initialization method may begin at step 600, where the controller 38 determines whether a template image is available for the trailer 12 being towed. If so, the controller 38 proceeds to step 610 to determine the hitch angle via the template matching method. The template matching method may determine the hitch angle in approximately 1 second and is generally the most reliable when compared to the centerline method and the steady state method. So long as the template image remains available, the template matching method is selected as the best available hitch angle detection. In the event no template image is available or the template matching method is unable to be executed (e.g., system error), the controller 38 proceeds to step 620 to determine whether the vehicle 14 and trailer 12 are moving in a straight direction. According to one embodiment, the direction of the vehicle 14 and trailer 12 may be determined by obtaining a steering angle from the steering angle sensor 64 over a period of time. If it is determined that the vehicle 14 and trailer 12 are moving in a straight direction, the controller 38 proceeds to step 625 and processes images captured by the imaging device 34 to derive a template image of the trailer 12 before proceeding to step 610 to determine the hitch angle via the template matching method. Otherwise, the controller 38 proceeds to step 630 to determine the hitch angle via the centerline method. The centerline method may determine the hitch angle in less than 1 second but is generally less reliable when compared to the template matching method and the steady state method.

Once the centerline method is selected, the controller 38 will continue to determine the hitch angle via the centerline method until a steady state condition is satisfied at step 640. As described previously herein, the steady state condition may be satisfied when the vehicle 14 and trailer 12 are moving in a straight direction or moving along a path at constant curvature. Or in other words, the steady state condition is satisfied when the yaw rate of the vehicle 14 and the trailer 12 become equal, thereby resulting in the hitch angle and the steering angle becoming constant. If the steady state condition is satisfied, the controller proceeds to step 650, where it determines whether the hitch angle is substantially zero. In instances where the steady state condition is satisfied due to the vehicle 14 and trailer 12 moving in a straight direction at a constant zero hitch angle value ($\gamma=0$), the controller 38 proceeds to step 625 and processes images captured by the imaging device 34 to derive a template image of the trailer 12 before proceeding to step 610 to determine the hitch angle via the template matching method. Otherwise, in instances where the steady state condition is satisfied due to the vehicle 14 and trailer 12 moving along a path at a constant non-zero hitch angle value ($\lambda \neq 0$), the controller proceeds to step 650 to determine the hitch angle via the steady state method. The steady state method may determine the hitch angle in approximately 1-3 seconds and is generally less reliable than the template matching method but more reliable than the centerline method. So long as the steady state condition is satisfied, the controller 38 will select either the template matching method or the steady state method. If the steady state method is the currently selected hitch angle detection method and the steady state condition is no longer satisfied, the controller 38 returns to step 630 to determine the hitch angle via the centerline method.

Figure 20:
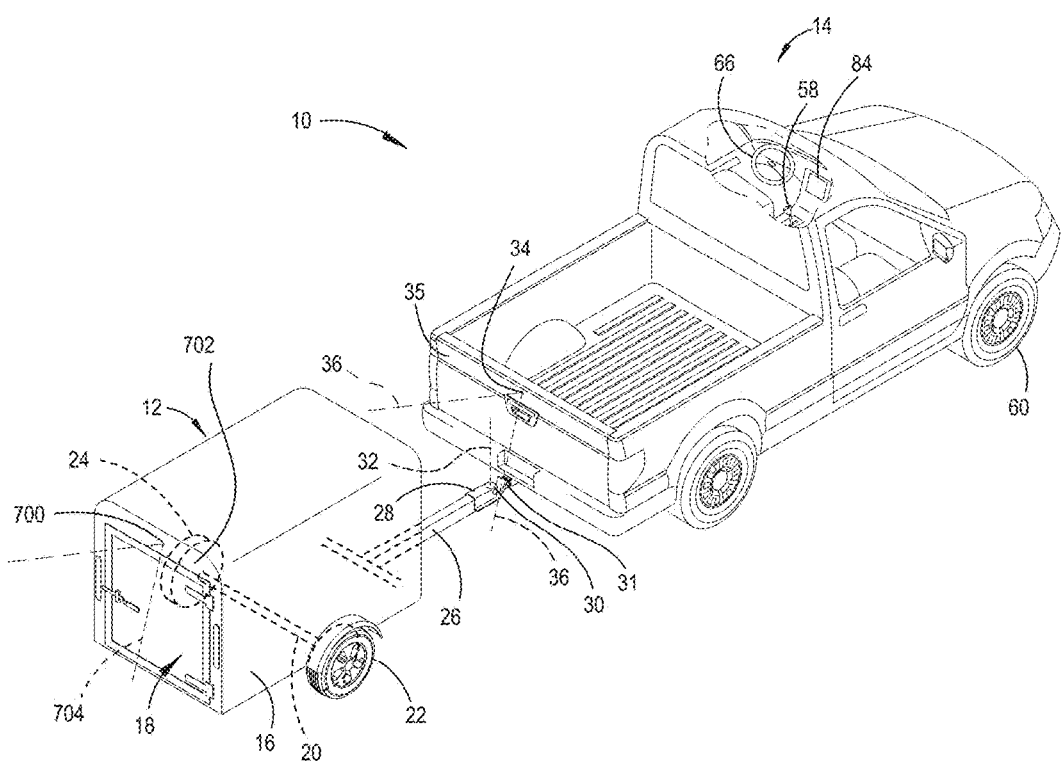
FIG. 20 is a top perspective view of a vehicle attached to a trailer with another embodiment of a hitch angle sensor for operating a trailer backup assist system.
Figure 21:
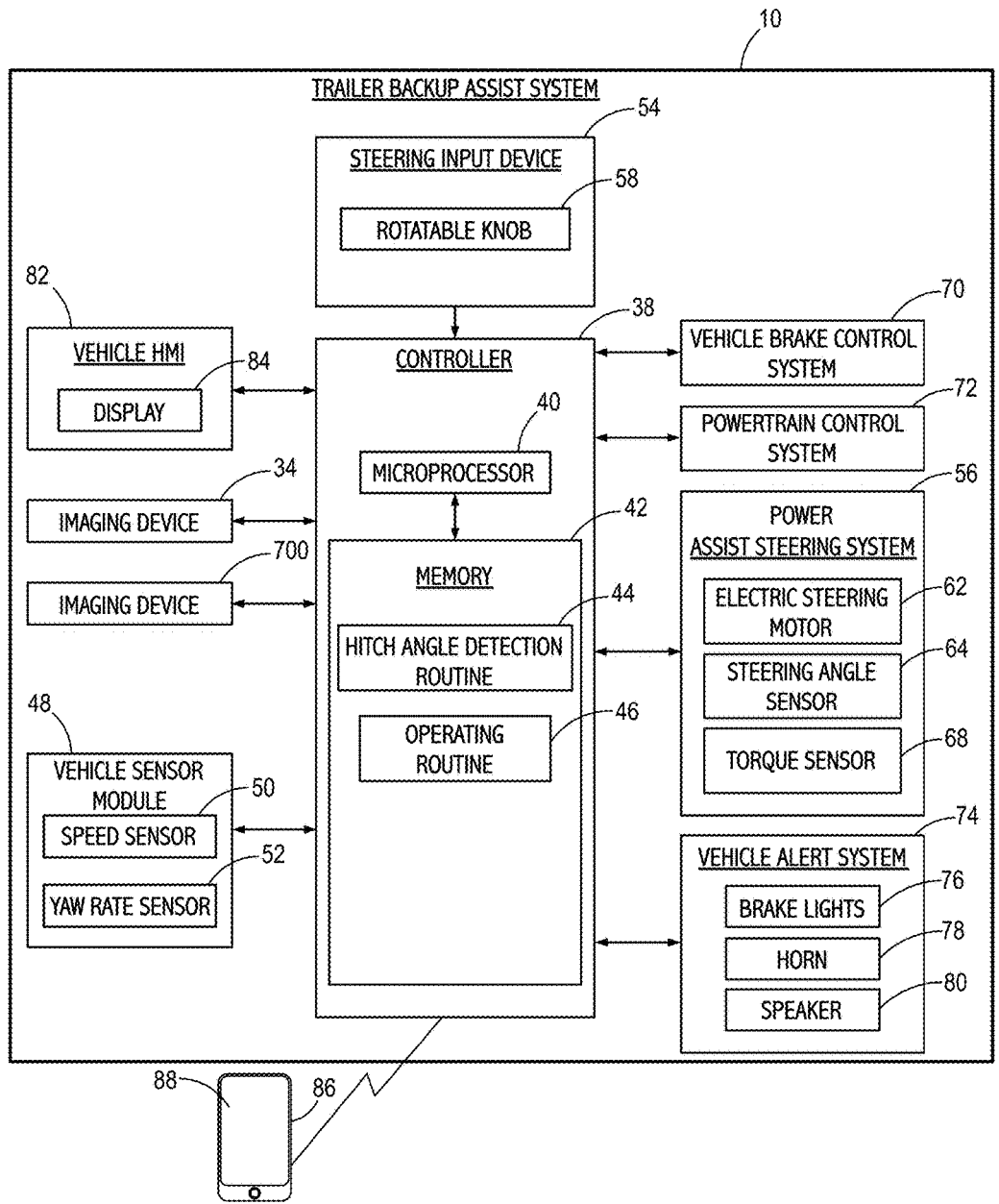
FIG. 21 is a block diagram illustrating another embodiment of the trailer backup assist system.

Referring to FIGS. 20 and 21, the trailer backup assist system 10 is shown according to another embodiment. The trailer backup assist system 10 may be configured similarly to that shown in FIGS. 1 and 2, with the addition of imaging device 700 mounted to the trailer 12. In the illustrated embodiment the imaging device 700 is mounted centrally to an upper portion 702 of the trailer 12 and includes a field 704 oriented to capture a rear-trailer scene. The imaging device 700 is communicatively coupled to the controller 38 and is configured to supply captured images to the controller 38 for processing. It is contemplated that the imaging device 700 may be wired to the controller 38 or otherwise communicates with the controller 38 in a wireless manner.

Figure 22:
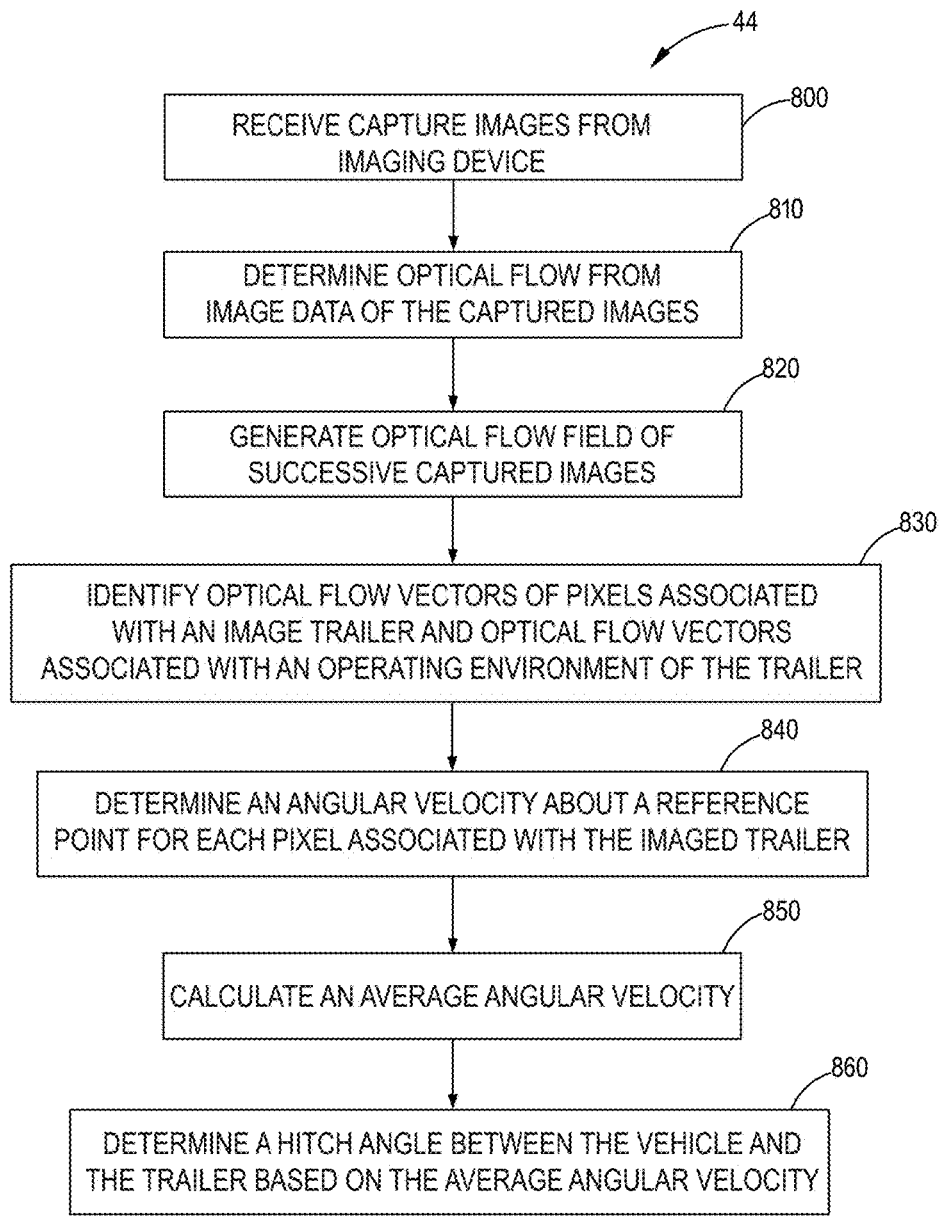
FIG. 22 is a flow diagram of a method of detecting a hitch angle, according to yet another embodiment.

Referring to FIG. 22, a method of detecting a hitch angle between the vehicle 14 and the trailer 12 is illustrated. The method, referred to herein as the "optical flow method," may be executed by the controller 38 of the trailer backup assist system 10 shown in FIGS. 20 and 21 and employs the use of imaging device 34. With respect to the present embodiment, the optical flow method is exemplarily shown as one embodiment of the hitch angle detection routine 44.

Figure 23:
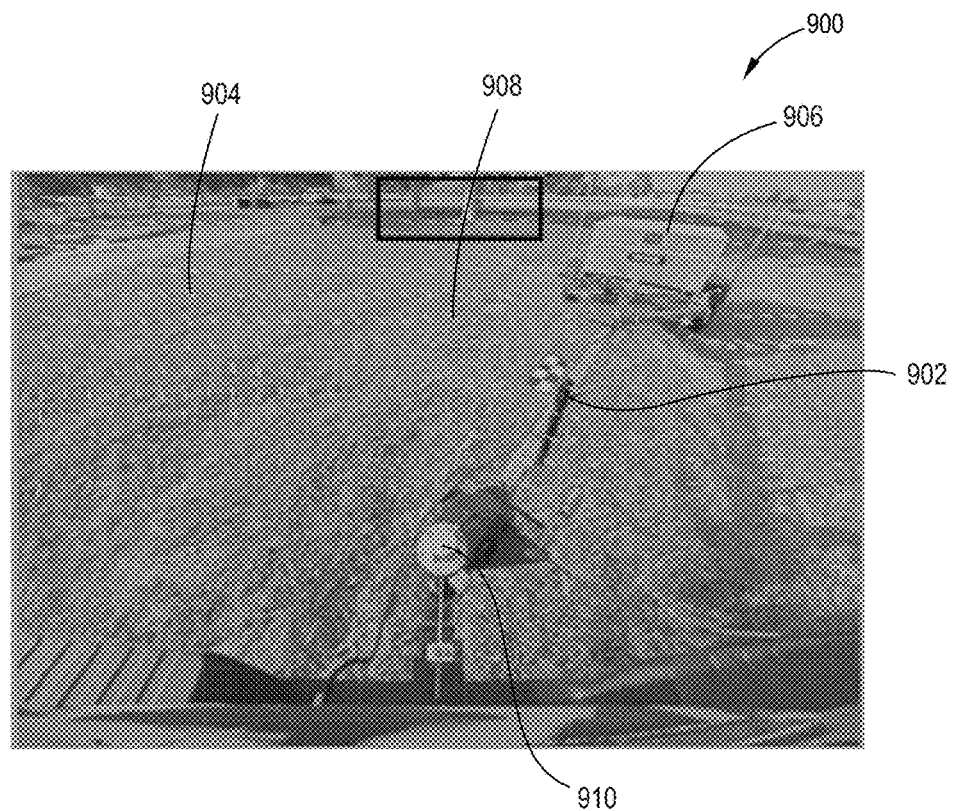
FIG. 23 is a captured image showing an optical flow field.

The optical flow method generally begins at step 800 where the controller 38 receives captured images from the imaging device 34 for imaging processing. At step 810, the controller 38 determines an optical flow from the image data of the captured images. According to one embodiment, the controller 38 processes successive captured images taken by imager 34 to generate an optical flow field at step 820. For purposes of illustration, a captured image 900 is generally shown in FIG. 23 along with a corresponding optical flow field that includes a number of optical flow vectors, wherein each optical flow vector (e.g., optical flow vectors 902 and 904) is representative of a velocity and direction of a pixel and object associated therewith. As can be seen in FIG. 23, two types of optical flow vectors are generally present in the captured image 900 and include optical flow vectors of pixels associated with an imaged trailer 906 and optical flow vectors of pixels associated with an operating environment 908 of the trailer 12. As described herein, the operating environment 908 may include a travelling surface (e.g., the ground) of the trailer 12 as well as background objects such as trees, signs, other vehicles, etc., located proximate the trailer 12 or in the horizon.

At step 830, the controller 38 identifies optical flow vectors of pixels associated with the operating environment 908 of the trailer 12 and optical flow vectors of pixels associated with the imaged trailer 906. Generally, the optical flow vector of pixels associated with the operating environment of the trailer 12, particularly the travelling surface of the trailer 12, is based on both the longitudinal motion and the yaw of the trailer 12 and can be readily predicted. Accordingly, the controller 38 derives a predictive optical flow vector for each pixel in the captured image 900 by assuming each pixel is associated with the operating environment 908 of the trailer 12 based on a vehicle speed and a steering angle of the vehicle 14, both of which may be supplied to the controller 38 via the speed sensor 50 and the steering angle sensor 64, respectively. The magnitudes of the optical flow vectors may be scaled based on a scaling factor determined by camera parameters such as field of view, resolution, and the like. Having derived the predicted optical flow vector for each pixel in the captured image 900, the controller 38 compares the actual optical flow vector of each pixel to the corresponding predicted optical flow vector. If they are close (e.g., within a predetermined threshold) in both direction and magnitude, the controller 38 determines that the actual optical flow vector is associated with the operating environment 908 of the trailer 12. Otherwise, the controller 38 determines that the actual optical flow vector is associated with the imaged trailer 906. For example, with respect to the optical flow field of the captured image 900 shown in FIG. 23, optical flow vector 902 would be distinguishable from the corresponding predictive optical flow vector and be associated with the imaged trailer 906 whereas optical flow vector 904 would match the corresponding predictive optical flow vector and be associated with the operating environment 908 of the trailer 12.

Having identified the optical flow vectors of pixels associated with the imaged trailer 906, the controller 38 determines an angular velocity about a reference point (e.g., imaged hitch point 910 in FIG. 23) for each pixel associated with the imaged trailer 906 at step 840. It is contemplated that the location of the imaged hitch point 910 may be determined in the same manner as outlined herein in the discussion related to the template matching method and the drawbar scan method, respectively. Next, at step 850, the controller 38 calculates an average angular velocity from the angular velocities determined at step 840. Finally, at step 860, the controller 38 determines a hitch angle between the vehicle 14 and the trailer 12 based on the average angular velocity calculated at step 850 and additional kinematic variables related to the vehicle 14 and the trailer 12. According to one embodiment, the controller 38 can solve the following equation for the hitch angle:

$$\dot{\gamma} = \frac{v}{D}\sin\gamma + \left(1 + \frac{L}{D}\cos\gamma\right)\frac{v}{W}\tan\delta$$

where $\dot{\gamma}$ is the average angular velocity, $\delta$ is the steering angle, L is the drawbar length between the hitch point and a rear axle of the vehicle 14, D is the trailer length between the hitch point and an axle of the trailer 12, W is the wheelbase length between a front axle and the rear axle of the vehicle 14, and v is the longitudinal speed of the vehicle 14. It is to be noted that the function $v/W \tan\delta$ corresponds to the yaw rate of the vehicle 14 and can be otherwise supplied by yaw rate sensor 52 (FIG. 21). The foregoing kinematic variables, with the exception of the average angular velocity $\dot{\gamma}$, have been shown in detail in FIG. 17. In alternative embodiments, the hitch angle can be derived by integrating the angular velocities determined in step 840 over a period of time from a referenced position (e.g., the imaged hitch point 910).

Alternatively, the instantaneous yaw rate of the vehicle 14 may be determined by analyzing the optical field vectors of pixels associated with the operating environment 908 of the trailer 12. As shown in FIG. 23, said optical field vectors indicate that the imaging device 34 exhibits a generally counterclockwise yaw rate. Accordingly, by virtue of the imaging device 34 being located on the vehicle 14, the vehicle 14 will share the same yaw rate as the imaging device 34. It is to be understood that an instantaneous yaw rate of the trailer 12 may be similarly determined. More specifically, the controller 38 processes successive captured images supplied from imaging device 700 to generate an optical flow field. The controller 38 may screen out optical flow vectors of pixels associated with non-static objects such as moving vehicles and the like against a predictive optical flow vector, as described previously herein. Using only the optical flow vectors of pixels associated with static objects, the controller 38 may determine a yaw rate of the imaging device 700 based on the magnitude and direction of said optical flow vectors. By virtue of the imaging device 700 being located on the trailer 12, the trailer 12 will share the same rate as the imaging device 700.

Figure 24:
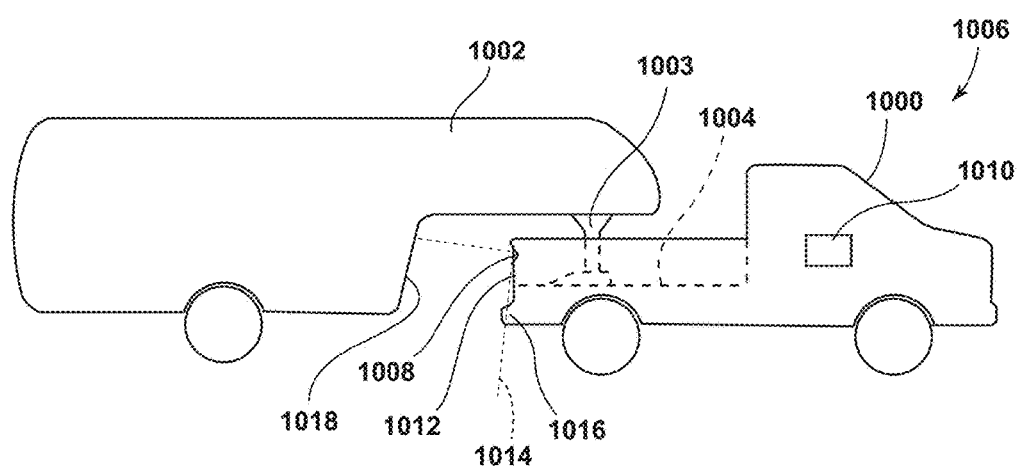
FIG. 24 illustrates a trailer type identification system according to one embodiment.

Referring to FIG. 24, a vehicle 1000 is shown connected to a trailer 1002. For purposes of illustration, the vehicle 1000 is exemplarily embodied as a pickup truck and the trailer 1002 is exemplarily embodied as a fifth wheel trailer (e.g., a camper) having a coupling 1003 installed to a bed 1004 of the vehicle 1000. The coupling 1003 may be any conventional coupling known to a skilled artisan. For example the coupling 1003 may include a kingpin that rotatably connects to a fixed horseshoe-shaped coupling device known as a fifth-wheel and generally secured to the bed 1004 of the vehicle 1000. As is known, a fifth wheel coupling generally provides greater towing stability. In some instances, hitch angle detection may vary depending on the type of trailer connected to the vehicle. Accordingly, in vehicles equipped with such functionality, there is a need to be able to distinguish between a fifth wheel trailer and standard trailer.

With further reference to FIG. 24, a trailer type identification system 1006 is disclosed herein including an imaging device 1008 and a controller 1010. Advantageously, the trailer type identification system 1006 may be implemented by the trailer backup assist system 10 described previously herein. For example, the imaging device 1008 may be imaging device 34 (FIG. 1) and is centrally located on an upper region of a tailgate 1012. The imaging device 1008 includes a field of view 1014 for capturing images of a rear vehicle scene that includes a bumper 1016 and at least one portion 1018 of the trailer 1002. In the depicted embodiment, portion 1018 generally corresponds to a frontal portion of the trailer 1002 facing the tailgate 1012. If desired, more or less of the trailer 1002 may be imaged by adjusting the field of view 1014 of the imaging device 1008. Images captured using the imaging device 1008 may be processed by the controller 1010 or elsewhere processed and sent to the controller 1010. The controller 1010 may be controller 38

(FIG. 2) and may be variously located in the vehicle 1000 or otherwise integrated with the imaging device 1008.

Figure 25:
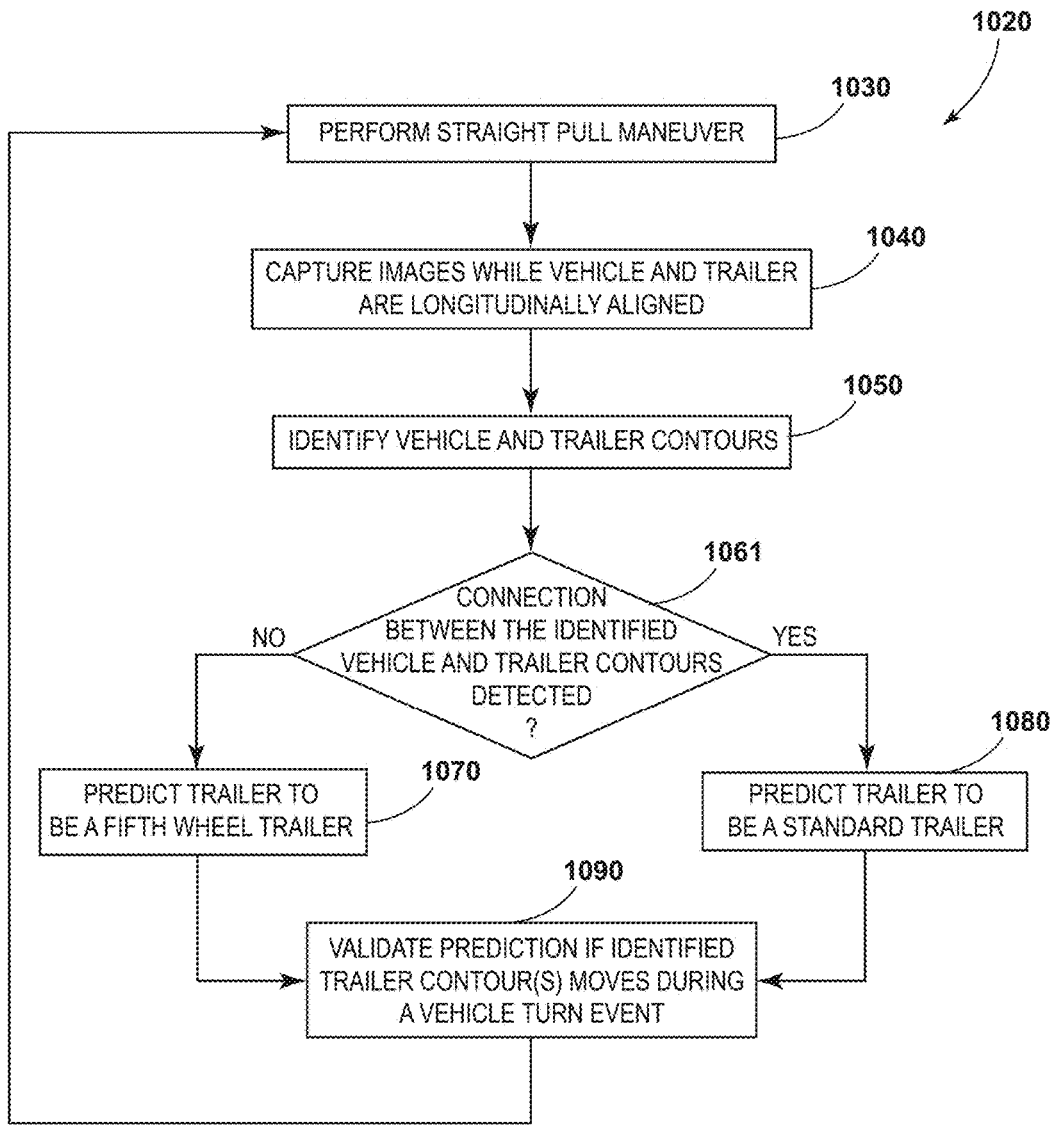
FIG. 25 is a flow diagram of a trailer type identification method implemented by the trailer identification system shown in FIG. 24.
Figure 26:
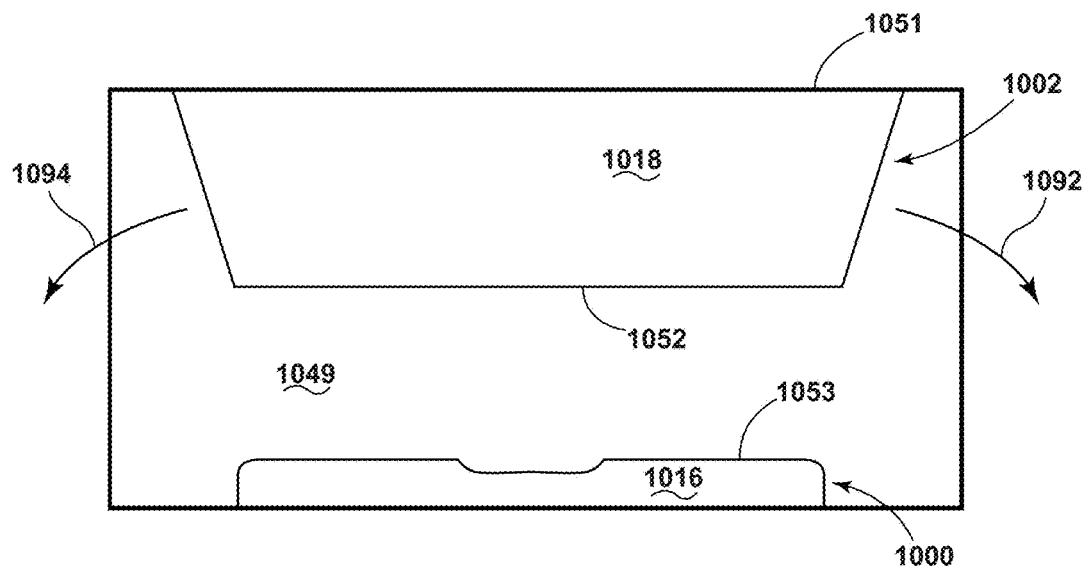
FIG. 26 represents an edge map showing identified contours of a vehicle and a fifth wheel trailer connected to the vehicle.
Figure 27:
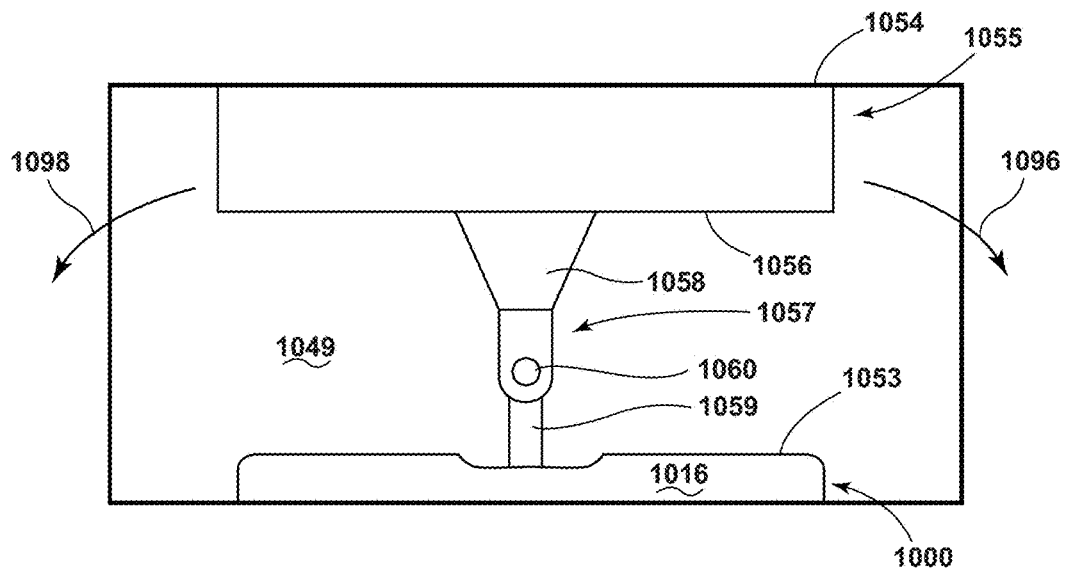
FIG. 27 represents an edge map showing identified contours of the vehicle and a standard trailer connected to the vehicle.

Referring to FIG. 25, a flow diagram of a trailer type identification method 1020 is shown and is implemented using the trailer type identification system 1006 described above. To better understand the concepts described below, the method 1020 will be described with reference to FIGS. 26 and 27. As will be discussed below, the trailer type identification method 1020 enables identification between a fifth wheel trailer (e.g., trailer 1002; FIG. 26) and a standard trailer (e.g., trailer 1055; FIG. 27). For purposes of disclosure, a standard trailer typically includes any trailer that is hitched to a vehicle using a conventional ball and socket coupling or the like.

At step 1030, a straight pull maneuver is performed where the vehicle 1000 is driven straight forward for a predetermined distance and/or time period such that the vehicle is longitudinally aligned with a connected trailer (e.g., trailer 1002 or 1055). In alternative embodiments, the vehicle and trailer combination may be backed up to accomplish the same. However, driving the vehicle 1000 forward may be preferable since it's typically easier for the driver to align the trailer to the vehicle 1000 in the forward direction. At step 1040, the imaging device 1008 captures images while the vehicle 1000 and trailer are longitudinally aligned. The captured images are processed by the controller 1010 to identify vehicle and trailer contours at step 1050. The trailer contours may be detected pursuant to steps 120-140 of the template matching method described previously herein. As outlined in those steps, successive images (e.g., image frames) are averaged or combined into an averaged image, which generally results in the blurring of imaged objects (e.g., the ground) that move in relation to the vehicle 1000 and the trailer. Next, an edge map or gradient map is derived from the averaged image and the trailer contour(s) can be detected by analyzing the intensity gradient for each pixel of the averaged image. It is contemplated that the vehicle contour(s) may be similarly detected. Alternatively, the vehicle contour(s) may be predetermined by the vehicle OEM since the shape/location of the vehicle 1000 and related components is known and unchanged in images captured by the imaging device 1008. In some embodiments where the vehicle contour(s) is known, all other identified contours may be characterized as trailer contours by default.

For purposes of illustration, FIG. 26 generally represents an edge map 1051 derived from images captured by the imaging device 1008 while the vehicle 1000 is longitudinally aligned with a fifth wheel trailer such as trailer 1002 described herein. In the edge map 1051, the ground 1049 is blurred out, and a trailer contour 1052 and a vehicle contour 1053 have been identified. As depicted, the trailer contour 1052 defines imaged portion 1018 of the trailer 1002 and the vehicle contour 1053 defines the imaged bumper 1016. For purposes of comparison, FIG. 27 generally represents an edge map 1054 depicting the vehicle 1000 longitudinally aligned with a standard trailer 1055 connected to the vehicle 1000. In the edge map 1054, the ground 1049 is blurred out, and a trailer contour 1056 has been identified. As expected, the vehicle contour 1053 is the same as that identified in the edge map 1051 of FIG. 26. Notably different, however, is the presence of a connecting member 1057 between the trailer contour 1056 and the vehicle contour 1053 in FIG. 27, whereas no such connection exists in the edge map 1051 shown in FIG. 26.

As depicted, the connecting member 1057 may be defined by a tongue 1058 of the trailer 1055 and a drawbar 1059 of the vehicle 1000. The tongue 1058 and drawbar 1059 may be coupled together via a ball and socket coupling 1060, for example. The respective contours of the tongue 1058, drawbar 1059, and any related accessories and components may be identified in the same manner as the trailer contour 1056. By virtue of the imaging device 1008 being centrally located on the tailgate 1012, the connecting member 1057 typically appears in captured images to be longitudinally aligned with the vehicle 1000 and the trailer 1055 during a straight pull maneuver. Thus, in identifying the connecting member 1057, the controller 1010 may consider whether the connecting member 1057 provides a qualified connection between the vehicle 1000 and the trailer 1055. Additionally, the controller 1010 may consider the size and/or shape of the connecting member 1057 in order to distinguish the same from any electrical connections (not shown) between the vehicle 1000 and the trailer 1055. However, in embodiments where the imaging device 1008 is offset, it is to be understood that the connecting member 1057 may appear differently (e.g., orientation, location, etc.) in the captured images. In view of the above, it is disclosed herein that the detection of a connection (e.g., connecting member 1057) in captured images provides key information in determining a trailer type, namely whether a connected trailer is a fifth wheel trailer or a standard trailer.

Referring back to FIG. 25, if the controller 1010 fails to detect a connection between the identified vehicle and trailer contours at step 1061, the controller 1010 predicts that the trailer is a fifth wheel trailer (e.g., trailer 1002) at step 1070. Otherwise, if the controller 1010 detects a connection between the identified vehicle and trailer contours at step 1061, the controller 1010 predicts that the trailer is a standard trailer (e.g., trailer 1055) at step 1080. Regardless of whether the controller 1010 predicts the trailer to be a fifth wheel trailer or a standard trailer, the controller 1010 can validate the prediction if the identified trailer contour(s) moves during a vehicle turn event at step 1090. For example, if the vehicle 1000 makes a leftward turn, the trailer contour 1052 identified in FIG. 26 would appear in captured images to move in a clockwise direction as generally specified by arrow 1092. Alternatively, if the vehicle 1000 makes a rightward turn, the identified trailer contour 1052 would appear in captured images to move in a counterclockwise direction as generally specified by arrow 1094. Accordingly, it is conceived that the controller 1010 may receive input (e.g., from steering angle sensor 64; FIG. 2) indicating a turn direction of the vehicle 1000 and subsequently analyze captured images to determine whether the identified trailer contour 1052 moves in the expected direction. If so, the controller 1010 validates that the trailer is a fifth wheel trailer.

Similarly, if the controller 1010 predicts the trailer to be a standard trailer, the controller 1010 can validate the prediction if the identified contour (e.g., trailer contour 1056) appears in captured images to move in an expected direction. That is, if the vehicle 1000 makes a leftward turn, the identified trailer contour 1056 would appear in captured images to move in a clockwise direction generally specified by arrow 1096. Alternatively, if the vehicle 1000 makes a rightward turn, the identified trailer contour 1056 would appear in captured images to move in a counterclockwise direction generally specified by arrow 1098. With respect to the validation at step 1090, if the identified trailer contour(s) fails to move, the method 1020 may be reiterated from step 1030 so that a new trailer contour may be identified, if available, and the previously identified trailer contour may be ignored in subsequent iterations. In instances where an identified trailer contour fails to exhibit motion during a vehicle turn event, it is likely that a false identification occurred and the identified trailer contour in question is actually part of the vehicle 1000 (e.g., a bike rack).

Once an identified trailer contour has been validated to correspond to a fifth wheel trailer or a standard trailer, the trailer contour may be monitored by the controller 1010 while the vehicle 1000 is operational. It is conceived that the controller 1010 may save one or more images captured by the imaging device 1008 throughout the operation of the vehicle and may designate the captured images as belonging to a fifth wheel trailer or a standard trailer. In one specific scenario, the controller 1010 saves one or more images captured by the imaging device 1008 when the vehicle 1000 is placed in park. In this manner, if the vehicle 1000 is turned OFF, captured images will be saved showing the trailer, designated as either a fifth wheel or standard trailer, in its last known position. Assuming the trailer is left hitched to the vehicle 1000 and the vehicle 1000 is later turned ON, the controller 1010 may readily identify the trailer as being a fifth wheel trailer or a standard trailer by simply matching the saved captured images to new ones taken by the imaging device 1008 at vehicle start-up. In such scenarios, where a match occurs, the need to perform method 1020 may be bypassed. According to one embodiment, the captured images may be saved in non-volatile memory and retrieved for a later key cycle. In such instances, the captured images may be saved after the vehicle 1000 is turned OFF and retrieved before the vehicle is turned ON. In other words, power may be provided to the controller 1010 or other module after the vehicle 1000 is turned OFF. For example, the controller 1010 may be maintained in a low power state while the vehicle 1000 is turned OFF. However, it will be appreciated that the captured images may alternatively be stored to the controller 1010 before the vehicle 1000 is turned OFF, if desired. Likewise, the saved captured images may be retrieved at or after vehicle start-up.

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A trailer type identification system comprising:
    an imaging device capturing images of a trailer connected to a vehicle; and
    a controller analyzing the captured images to:
        identify vehicle and trailer contours;
        predict that the trailer is a fifth wheel trailer if unable to detect a connection between the identified vehicle and trailer contours;
        validate the prediction if the identified trailer contour exhibits motion during a vehicle turn event; and
        control backing the trailer based on the prediction.

2. The trailer type identification system of claim 1, wherein the controller predicts that the trailer is a standard trailer if able to detect the connection between the identified vehicle and trailer contours.

3. The trailer type identification system of claim 1, wherein an identified vehicle contour defines a rear bumper of the vehicle.

4. The trailer type identification system of claim 1, wherein the connection comprises a connecting member providing a qualified connection between the vehicle and the trailer.

5. The trailer type identification system of claim 4, wherein the connecting member is defined by a trailer tongue and a drawbar coupled thereto.

6. The trailer type identification system of claim 4, wherein the controller considers at least one of size and shape in detecting the connecting member.

7. The trailer type identification system of claim 1, wherein the controller saves one or more captured images showing an identified trailer contour in its last known position, and wherein the controller attempts to match the one or more saved captured images to subsequently captured images in order to ascertain the identity of the trailer.

8. A trailer type identification system comprising:
    an imaging device capturing images of a trailer connected to a vehicle; and
    a controller analyzing the captured images to:
        identify vehicle and trailer contours;
        predict a trailer type based on detection of a connection between the identified vehicle and trailer contours;
        validate the prediction if the identified trailer contour exhibits motion during a vehicle turn event; and
        controlling backing the trailer based on the trailer type.

9. The trailer type identification system of claim 8, wherein the controller predicts that the trailer is a fifth wheel trailer if unable to detect the connection between the identified vehicle and trailer contours.

10. The trailer type identification system of claim 8, wherein the controller predicts that the trailer is a standard trailer if able to detect the connection between the identified vehicle and trailer contours.

11. The trailer type identification system of claim 8, wherein the connection comprises a connecting member providing a qualified connection between the vehicle and the trailer.

12. The trailer type identification system of claim 11, wherein the connecting member is defined by a trailer tongue and a drawbar coupled thereto.

13. The trailer type identification system of claim 11, wherein the controller considers at least one of size and shape in detecting the connecting member.

14. The trailer type identification system of claim 8, wherein the controller saves one or more captured images showing an identified trailer contour in its last known position, and wherein the controller attempts to match the one or more saved captured images to subsequently captured images in order to ascertain the identity of the trailer.

15. A trailer type identification system comprising:
    an imaging device capturing images of a trailer connected to a vehicle; and
    a controller analyzing the captured images to:
        detect vehicle and trailer contours;
        predict a trailer type based on detection of a connection between the identified vehicle and trailer contours;
        validate the prediction if the detected trailer contour exhibits an expected motion during a vehicle turn event; and
        control backing the trailer based on the trailer type.

16. The trailer type identification system of claim 15, wherein the controller predicts that the trailer is a fifth wheel trailer if unable to detect the connection between the identified vehicle and trailer contours.

17. The trailer type identification system of claim 15, wherein the controller predicts that the trailer is a standard trailer if able to detect the connection between the identified vehicle and trailer contours.

18. The trailer type identification system of claim 15, wherein the expected motion is based on input related to a turn direction of the vehicle.

19. The trailer type identification system of claim 18, wherein if the input indicates a turn in a leftward direction, the expected motion occurs in a clockwise direction.

20. The trailer type identification system of claim 18, wherein if the input indicates a turn in a rightward direction, the expected motion occurs in a counterclockwise direction.

* * * * *